United States Patent
Mishima et al.

(10) Patent No.: US 9,854,132 B2
(45) Date of Patent: Dec. 26, 2017

(54) IMAGE PROCESSING APPARATUS, DATA REGISTRATION METHOD, AND DATA REGISTRATION PROGRAM

(71) Applicant: KONICA MINOLTA INC., Chiyoda-ku, Tokyo (JP)

(72) Inventors: Nobuhiro Mishima, Osaka (JP); Junichi Hase, Osaka (JP); Toshikazu Kawaguchi, Kobe (JP); Hidetaka Iwai, Itami (JP); Yosuke Taniguchi, Osaka (JP); Hideaki Soejima, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/963,173

(22) Filed: Dec. 8, 2015

(65) Prior Publication Data
US 2016/0173731 A1   Jun. 16, 2016

(30) Foreign Application Priority Data
Dec. 10, 2014   (JP) .................................. 2014-250308

(51) Int. Cl.
*H04N 1/44*   (2006.01)
*G06K 9/00*   (2006.01)
(Continued)

(52) U.S. Cl.
CPC ......... *H04N 1/4433* (2013.01); *G02B 27/017* (2013.01); *G02B 27/0172* (2013.01);
(Continued)

(58) Field of Classification Search
CPC ............. H04N 1/4433; H04N 1/00244; H04N 1/00251; H04N 1/00411; H04N 1/2104;
(Continued)

(56) References Cited

U.S. PATENT DOCUMENTS 6,389,182 B1   5/2002   Ihara et al.
9,153,074 B2*  10/2015  Zhou ....................... G06F 1/163
(Continued)

FOREIGN PATENT DOCUMENTS

JP   2000082107 A   3/2000
JP   2006080940 A   3/2006
(Continued)

OTHER PUBLICATIONS

Japanese Office Action (and English translation thereof) dated Jan. 31, 2017, issued in counterpart Japanese Application No. 2014-250308.
(Continued)

*Primary Examiner* — Allen H Nguyen
(74) *Attorney, Agent, or Firm* — Holtz, Holtz & Volek PC

(57) ABSTRACT

An information processing apparatus includes: an imaging unit configured to capture an image of a subject; an image extraction unit configured to extract an image of a predetermined shape from a captured image being the image of the subject captured and output by the imaging unit; and a registration unit configured to, upon the image extraction unit extracting a first image identifying input data and a second image identifying a storage area, store the input data identified by the first image in the storage area identified by the second image.

18 Claims, 16 Drawing Sheets

(51) Int. Cl.
 *G02B 27/01* (2006.01)
 *H04N 1/21* (2006.01)
 *G06K 7/10* (2006.01)
 *H04N 1/00* (2006.01)

(52) U.S. Cl.
 CPC ..... *G06K 9/00671* (2013.01); *H04N 1/00244* (2013.01); *H04N 1/00251* (2013.01); *H04N 1/00334* (2013.01); *H04N 1/00411* (2013.01); *H04N 1/2104* (2013.01); *G02B 2027/014* (2013.01); *G02B 2027/0138* (2013.01); *G02B 2027/0178* (2013.01); *G02B 2027/0187* (2013.01); *H04N 2201/0039* (2013.01); *H04N 2201/0055* (2013.01); *H04N 2201/0074* (2013.01); *H04N 2201/0084* (2013.01)

(58) Field of Classification Search
 CPC ....... H04N 1/00334; H04N 2201/0084; H04N 2201/0039; H04N 2201/0055; H04N 2201/0074; G06K 7/1092; G06K 9/00671; G02B 27/0172; G02B 27/017; G02B 2027/0138; G02B 2027/014; G02B 2027/0178; G02B 2027/0187
 USPC ........................................................ 358/1.14
 See application file for complete search history.

(56) References Cited

U.S. PATENT DOCUMENTS

| | | | | |
|---|---|---|---|---|
| 9,613,480 | B2* | 4/2017 | Massicot | G07D 7/128 |
| 2003/0198383 | A1* | 10/2003 | Yamaguchi | G06K 7/14 |
| | | | | 382/183 |
| 2007/0102521 | A1* | 5/2007 | Petersson | G06Q 10/10 |
| | | | | 235/462.1 |
| 2010/0315681 | A1* | 12/2010 | Misawa | H04N 1/32144 |
| | | | | 358/1.15 |
| 2012/0078725 | A1* | 3/2012 | Maitra | G06Q 30/0269 |
| | | | | 705/14.66 |
| 2012/0120103 | A1* | 5/2012 | Border | G02B 27/017 |
| | | | | 345/633 |
| 2013/0201002 | A1* | 8/2013 | Wollin | G06Q 10/08 |
| | | | | 340/8.1 |
| 2013/0233917 | A1 | 9/2013 | Utsunomiya et al. | |
| 2014/0075330 | A1* | 3/2014 | Kwon | G06F 3/038 |
| | | | | 715/750 |
| 2014/0115708 | A1* | 4/2014 | Terwilliger | G06F 21/36 |
| | | | | 726/26 |
| 2015/0123966 | A1* | 5/2015 | Newman | G06T 19/006 |
| | | | | 345/419 |

FOREIGN PATENT DOCUMENTS

| | | |
|---|---|---|
| JP | 2007026427 A | 2/2007 |
| JP | 2008243193 A | 10/2008 |
| JP | 2011139176 A | 7/2011 |
| JP | 2011159146 A | 8/2011 |
| JP | 2013186804 A | 9/2013 |

OTHER PUBLICATIONS

Japanese Office Action (and English translation thereof) dated Jun. 27, 2017 in counterpart Japanese Application No. 2014-250308.

* cited by examiner

FIG. 6

| FIRST ITEM NAME | SECOND ITEM NAME | DATA FORMAT | SIZE |
|---|---|---|---|
| NAME | LAST NAME | CHARACTER | 10 |
|  | FIRST NAME | CHARACTER | 10 |
| DATE OF BIRTH | ANNO DOMINI | NUMERIC | 8 |
|  | ERA NAME | CHARACTER | 2 |
| GENDER | — | CHARACTER | 1 |
| BLOOD TYPE | — | CHARACTER | 1 |
| HOME | ZIP CODE | CHARACTER | 7 |
|  | ADDRESS | CHARACTER | 50 |
|  | TELEPHONE NUMBER | CHARACTER | 9 |
|  | MOBILE PHONE | CHARACTER | 11 |
|  | ELECTRONIC MAIL ADDRESS | CHARACTER | 20 |
| JOB | COMPANY NAME | CHARACTER | 20 |
|  | DEPARTMENT NAME | CHARACTER | 20 |
|  | TITLE | CHARACTER | 10 |
|  | ZIP CODE | CHARACTER | 7 |
|  | ADDRESS | CHARACTER | 50 |
|  | TELEPHONE NUMBER | CHARACTER | 9 |
|  | MOBILE PHONE | CHARACTER | 11 |
|  | ELECTRONIC MAIL ADDRESS | CHARACTER | 20 |
| EDUCATIONAL BACKGROUND | ELEMENTARY SCHOOL | CHARACTER | 20 |
|  | JUNIOR HIGH SCHOOL | CHARACTER | 20 |
|  | HIGH SCHOOL | CHARACTER | 20 |
|  | UNIVERSITY | CHARACTER | 20 |

| ITEM NAME | DATA FORMAT | SIZE |
|---|---|---|
| NAME | CHARACTER | 20 |
| DATE OF BIRTH (ANNO DOMINI) | CHARACTER | 10 |
| GENDER | CHARACTER | 1 |
| ZIP CODE | CHARACTER | 8 |
| ADDRESS 1 | CHARACTER | 10 |
| ADDRESS 2 (LOT/HOUSE NUMBER) | CHARACTER | 10 |
| ADDRESS 3 (BUILDING) | CHARACTER | 10 |
| TELEPHONE NUMBER | NUMERIC | 8 |
| MOBILE PHONE | NUMERIC | 11 |
| ELECTRONIC MAIL ADDRESS | CHARACTER | 20 |

| ITEM NAME |
|---|
| NAME |
| DATE OF BIRTH (ANNO DOMINI) |
| GENDER |
| ZIP CODE |
| ADDRESS |
| TELEPHONE NUMBER |
| MOBILE PHONE |
| ELECTRONIC MAIL ADDRESS |

IMAGE PROCESSING APPARATUS, DATA REGISTRATION METHOD, AND DATA REGISTRATION PROGRAM

The entire disclosure of Japanese Patent Application No. 2014-250308 filed on Dec. 10, 2014 including description, claims, drawings, and abstract are incorporated herein by reference in its entirety.

BACKGROUND OF THE INVENTION

Field of the Invention

The present invention relates to an image processing apparatus, a data registration method, and a data registration program, and particularly relates to an image processing apparatus having an imaging function such as a camera, and a data registration method and a data registration program that are executed by the image processing apparatus.

Description of the Related Art

In recent years, a technology related to augmented reality has been developed. For example, JP 2000-082107 A describes an image processing apparatus including an image acquisition unit that acquires a target image, an identification information recognition unit that recognizes identification information corresponding to a predetermined image pattern from the target image acquired by the image acquisition unit, and an activation unit that activates a predetermined process corresponding to the identification information recognized by the identification information recognition unit, among a plurality of preregistered processes, and starts execution of the process.

However, in the known image processing apparatus, a process to be executed on identification information corresponding to a predetermined image pattern is fixed. Therefore, there is a problem that one type of process can be performed on the predetermined image pattern.

SUMMARY OF THE INVENTION

The present invention has been made to solve the abovementioned problem, and one object of the present invention is to provide an information processing apparatus where data registration is facilitated.

Another object of the present invention is to provide a data registration method where data registration is facilitated.

Still another object of the present invention is to provide a data registration program where data registration is facilitated.

To achieve at least one of the abovementioned objects, according to an aspect, an information processing apparatus reflecting one aspect of the present invention comprises: an imaging unit configured to capture an image of a subject; an image extraction unit configured to extract an image of a predetermined shape from a captured image being the image of the subject captured and output by the imaging unit; and a registration unit configured to, upon the image extraction unit extracting a first image identifying input data and a second image identifying a storage area, store the input data identified by the first image in the storage area identified by the second image.

According to the aspect, if the first image identifying input data and the second image identifying a storage area are extracted from a captured image being the image of the subject captured and output, the input data identified by the first image is stored in the storage area identified by the second image. When the first and second images are captured, the input data is stored in the storage area. Accordingly, an information processing apparatus where data registration is facilitated can be provided.

The registration unit preferably acquires first item information related to a plurality of items of a first type constituting the input data identified by the first image, acquires second item information related to a plurality of items of a second type constituting data to be stored in the storage area identified by the second image, associates each of the plurality of items of the second type with any of the plurality of items of the first type based on the first item information and the second item information, generates registration data being the converted input data, identified by the first image, into data of a corresponding item of the plurality of items of the second type, and stores the generated registration data in the storage area.

According to the aspect, the first item information related to the plurality of items of the first type constituting the input data is acquired. The second item information related to the plurality of items of the second type constituting data to be stored in the storage area is acquired. Each of the plurality of items of the second type is associated with any of the plurality of items of the first type. The input data is converted into data of the corresponding item of the plurality of items of the second type. Hence, the input data can be registered in agreement with the configuration of the data to be stored in the storage area.

The registration unit preferably acquires, as partial data, data of items associated respectively with the plurality of items of the second type, among the plurality of items of the first type of the input data identified by the first image, and converts data of at least one item included in the acquired partial data into data of a corresponding item of the plurality of items of the second type.

According to the aspect, data of items associated respectively with the plurality of items of the second type, among the plurality of items of the first type of the input data, is acquired as the partial data. Data of at least one item included in the partial data is converted into data of a corresponding item of the plurality of items of the second type. Hence, only a part necessary to be stored in the storage area is acquired from the input data. Therefore, the processing can be simplified.

The registration unit preferably uses a first association table that associates each of the plurality of items of the first type with any of a plurality of basic items, and a second association table that associates each of the plurality of items of the second type with any of the plurality of basic items to associate each of the plurality of items of the second type with any of the plurality of items of the first type.

According to the aspect, the first association table and the second association table are used to associate each of the plurality of items of the second type with any of the plurality of items of the first type. Accordingly, even if the input data is different in configuration from the data to be stored in the storage area, the input data can be stored in the storage area.

The registration unit preferably compares an item name of each of the plurality of items of the first type included in the first item information with an item name of each of the plurality of items of the second type included in the second item information.

According to the aspect, an item name of each of the plurality of items of the first type is compared with an item name of each of the plurality of items of the second type. Accordingly, each of the plurality of items of the second type can be associated with any of the plurality of items of the first type.

The information processing apparatus further preferably comprises an activation unit configured to, upon the image extraction unit extracting a third image providing a predetermined process, in addition to the first image and the second image, execute the process provided by the third image.

According to the aspect, if the third image is extracted, the process provided by the third image is executed. Hence, another process, in addition to the process of storing the input data in the storage area, can be executed by capturing the first, second, and third images.

The predetermined process preferably includes a process targeting the input data identified by the first image for processing.

According to the aspect, the process targeting the input data for processing, in addition to the process of storing the input data in the storage area, can be executed by capturing the first, second, and third images.

The predetermined process preferably includes a process targeting the registration data to be stored by the registration unit for processing.

According to the aspect, the process targeting the data to be stored in the storage area for processing, in addition to the process of storing the input data in the storage area, can be executed by capturing the first, second, and third images.

The image extraction unit preferably extracts the first and second images from a single captured image being an image of subjects captured and output by the imaging unit.

According to the aspect, the input data can be stored in the storage area in single image capture.

The image extraction unit preferably extracts the first and second images respectively from a plurality of captured images being images of subjects captured and output by the imaging unit.

According to the aspect, the input data can be stored in the storage area from the plurality of captured images captured at different times.

The first and the second image are preferably two-dimensional barcodes, the first image preferably includes location information indicating the location of the input data, and the second image preferably includes location information indicating the location of the storage area.

The information processing apparatus further preferably comprises: an operation acceptance unit configured to accept a user's operation; and a display unit configured to display an image, and the registration unit preferably displays the registration data on the display unit, edits the registration data, and stores the registration data on the condition that the operation acceptance unit accepts the user's permission operation.

According to the aspect, the data edited by the user can be stored in the storage area.

To achieve at least one of the abovementioned objects, according to an aspect, a data registration method to be executed by an information processing apparatus including an imaging unit configured to capture an image of a subject, the method reflecting one aspect of the present invention comprises: an image extraction step of extracting an image of a predetermined shape from a captured image being the image of the subject captured and output by the imaging unit; and a registration step of, upon extracting a first image indicating a code identifying input data and a second image identifying a storage area in the image extraction step, storing the input data identified by the first image in the storage area identified by the second image.

According to the aspect, the data registration method where data registration is facilitated can be provided.

To achieve at least one of the abovementioned objects, according to an aspect, a non-transitory recording medium storing a computer readable data registration program to be executed by a computer controlling an information processing apparatus including an imaging unit configured to capture an image of a subject, the program reflecting one aspect of the present invention causes the computer to execute: an image extraction step of extracting an image of a predetermined shape from a captured image being the image of the subject captured and output by the imaging unit; and a registration step of, upon extracting a first image identifying input data and a second image identifying a storage area in the image extraction step, storing the input data identified by the first image in the storage area identified by the second image.

According to the aspect, the data registration program where data registration is facilitated can be provided.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 6 is a diagram illustrating an example of a data structure of a first table;

DESCRIPTION OF THE PREFERRED EMBODIMENTS

Figure 1:
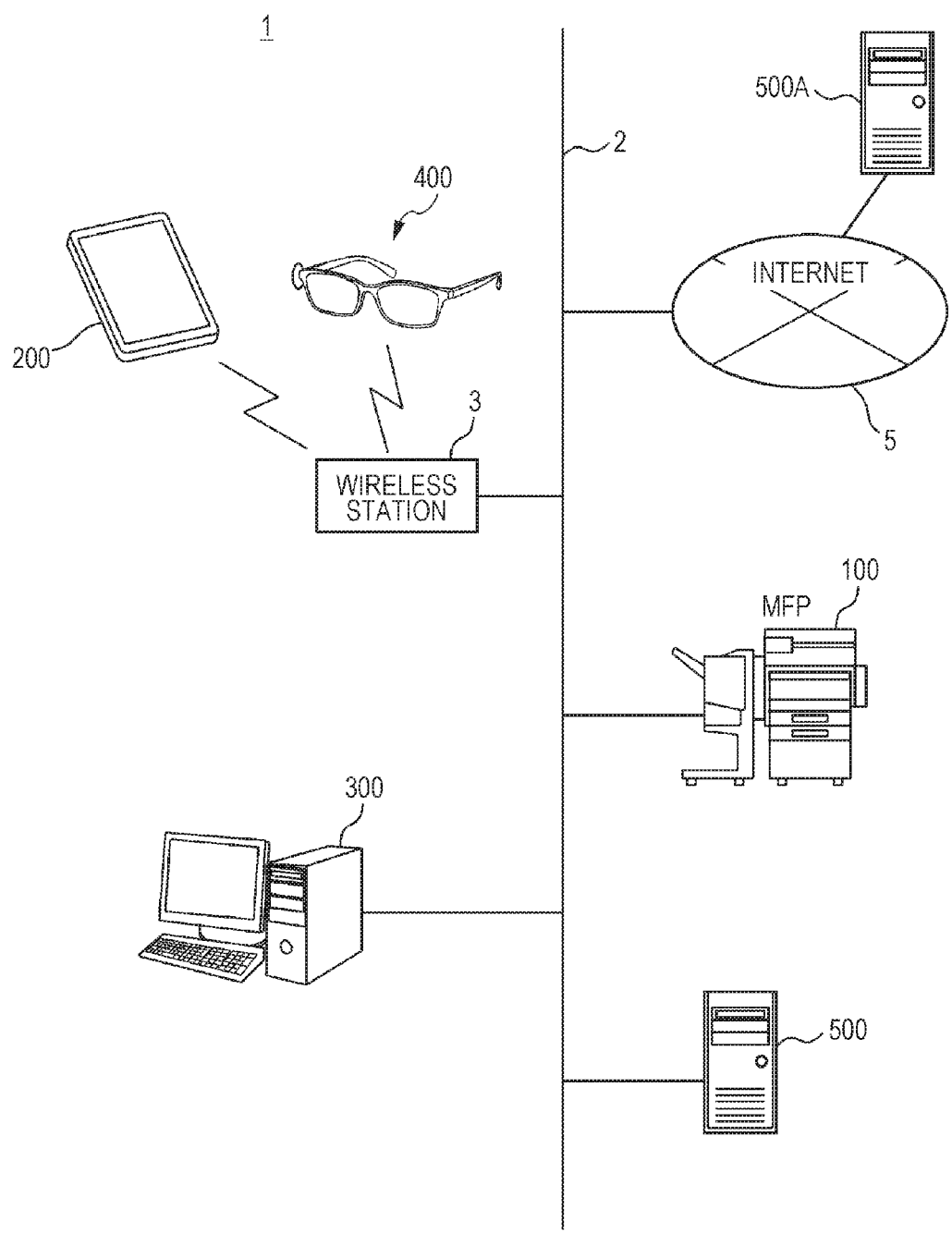
FIG. 1 is a diagram illustrating an example of a general outline of a data registration system according to an embodiment of the present invention.

Hereinafter, an embodiment of the present invention will be described with reference to the drawings. However, the scope of the invention is not limited to the illustrated examples. The same reference numerals are assigned to the same components in the following description. Their names and functions are also the same. Therefore, their detailed descriptions are not repeated.

FIG. 1 is a diagram illustrating an example of a general outline of a data registration system according to an embodiment of the present invention. With reference to FIG. 1, a data registration system 1 includes an MFP (Multi Function Peripheral) 100, a mobile information apparatus 200, a personal computer (hereinafter referred to as "PC") 300, a head mounted display (hereinafter referred to as "HMD") 400, and servers 500 and 500A.

The head mounted display (hereinafter referred to as "HMD") 400 has an eyeglasses-shape, and is used worn by a user. The HMD 400 functions as an image processing apparatus, and has an imaging function that captures an image of a subject, a function of storing data, a display function of displaying images on lens portions of the eyeglasses, and a communication function using a wireless LAN. The user wearing the HMD 400 can visually recognize images displayed on the lenses simultaneously with visually recognizing a subject through the lenses.

The mobile information apparatus 200 is another example of the image processing apparatus. The mobile information apparatus 200 is used carried by a user, for example, a PDA (Personal Digital Assistants) or smartphone, and has an imaging function of capturing an image of a subject, a function of storing data, a display function of displaying an image, and a communication function using a wireless LAN. Moreover, an application program can be installed on the mobile information apparatus 200.

The MFP 100 has a document reading function of reading a document, an image forming function of forming an image on a recording medium such as paper based on image data, and a facsimile transmitting/receiving function of transmitting/receiving facsimile data.

The PC 300 and the servers 500 and 500A are general computers. Their hardware configurations and functions are known. Therefore, their descriptions are not repeated here.

A wireless station 3, the MFP 100, the PC 300, and the server 500 are respectively connected to a network 2. The network 2 is a local area network (LAN). It does not matter whether the connection mode is wired or wireless. Moreover, the network 2 is not limited to a LAN, and may be, for example, a network using the public switched telephone networks. Furthermore, the network 2 may be a wide area network (WAN) such as the Internet.

Furthermore, the network 2 is connected to an Internet 5. The server 500A is connected to the Internet 5. Hence, the wireless station 3, the MFP 100, the PC 300, and the server 500 can communicate with each other via the network 2, and can communicate respectively with the server 500A via the Internet 5. The wireless station 3 is a relay device on the network 2, and communicates with the mobile information apparatus 200 and the HMD 400, which have the communication function using a wireless LAN, to connect the mobile information apparatus 200 and the HMD 400 to the network 2. Hence, each of the mobile information apparatus 200 and the HMD 400 can mutually communicate with the MFP 100, the PC 300, and the servers 500 and 500A.

Figure 2:
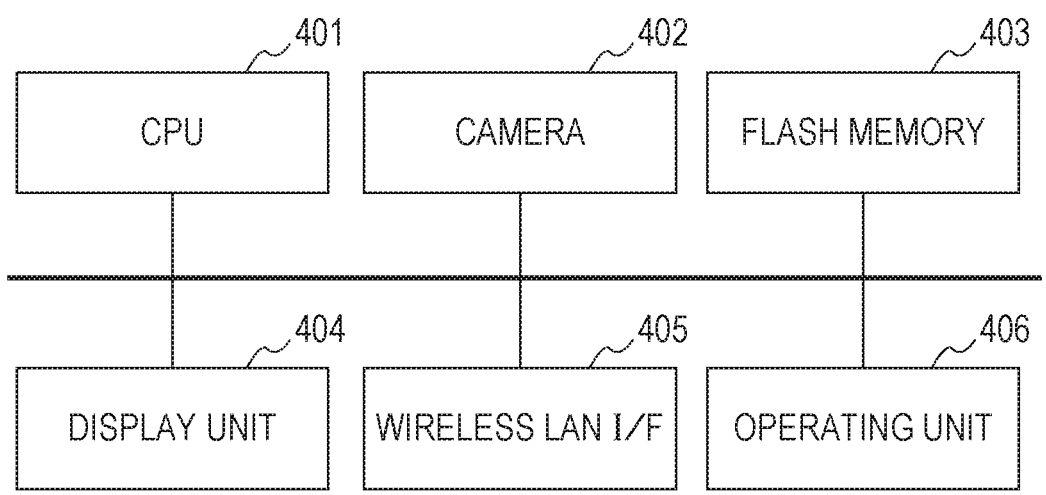
FIG. 2 is a block diagram illustrating an example of a hardware configuration of a HMD according to the embodiment.

FIG. 2 is a block diagram illustrating an example of a hardware configuration of a HMD according to the embodiment. With reference to FIG. 2, the HMD 400 according to the embodiment includes a CPU 401 for controlling the entire HMD 400, a camera 402, a flash memory 403 that stores data in a nonvolatile manner, a display unit 404 that displays information, a wireless LAN I/F 405, and an operating unit 406.

The camera 402 includes a lens and a photoelectric conversion device, and forms an image of light condensed by the lens on the photoelectric conversion device. The photoelectric conversion device photoelectrically converts the received light, and outputs the image data to the CPU 401. The photoelectric conversion device is a CMOS (Complementary Metal Oxide Semiconductor) sensor, a CCD (Charge Coupled Device) sensor, or the like. The camera 402 is described here taking an example of capturing a still image. However, a videocamera that captures a moving image may be used. If a videocamera is used, one of a plurality of frames included in a moving image is required to be handled as a still image.

The display unit 404 is a liquid crystal display (LCD) made of a transparent member, and is embedded in surfaces of the lenses of the HMD 400. A display surface of the display unit 404 is placed in such a manner as to have the same field of view as that of a case where the user is wearing the HMD 400. Hence, an image can be displayed at an arbitrary position in the user's field of view. The optical axis and the imaging area of the camera 402 are placed at positions that are determined relative to the display surface of the display unit 404. Specifically, the optical axis and the imaging area of the camera 402 are set in such a manner as to have the same field of view as that of the case where the user is wearing the HMD 400. Hence, an image captured and obtained by the camera 402 is substantially the same as an image in the user's actual field of view.

The wireless LAN I/F 405 is an interface for communicating with the wireless station 3, and connecting the HMD 400 to the network 2. IP (Internet Protocol) addresses of the mobile information apparatus 200, the servers 500 and 500A, the MFP 100, and the PC 300 are preregistered in the HMD 400. Accordingly, the wireless LAN I/F 405 can communicate with the mobile information apparatus 200, the servers 500 and 500A, the MFP 100, and the PC 300 to enable the transmission and receipt of data. The embodiment is described taking, as an example, a case where the HMD 400 uses the wireless LAN I/F 405 to communicate with the MFP 100, the PC 300, the HMD 400, and the servers 500 and 500A. However, another communication method may be used for communications. Specifically, if a short-range wireless device with, for example, Bluetooth (registered trademark) is mounted on the mobile information apparatus 200, the MFP 100, the PC 300, the HMD 400, and the server 500, the HMD 400 may communicate one-on-one with any of the MFP 100, the PC 300, the mobile information apparatus 200, and the server 500. Moreover, the HMD 400 may be connected to any of the MFP 100, the PC 300, the mobile information apparatus 200, and the server 500 in a wired manner such as a USB (Universal Serial Bus) cable to communicate one-on-one with the MFP 100, the PC 300, the mobile information apparatus 200, and the server 500.

A program to be executed by the CPU 401, or data necessary to execute the program, is stored in the flash memory 403. The CPU 401 loads the program recorded in the flash memory 403 into RAM equipped with the CPU 401 to execute the program. In this case, another computer connected to the network 2 or the Internet 5 may rewrite the program stored in the flash memory 403, or add and write a new program. Furthermore, the HMD 400 may download the program from another computer connected to the network 2 or the Internet 5 to store the program in the flash memory 403. The program here includes not only a program that can be executed directly by the CPU 401 but also a source program, a compressed program, and an encoded program.

The operating unit 406 includes a microphone, collects a voice emitted by the user with the microphone, recognizes the collected voice, and accordingly accepts the user's instruction. For example, a command name corresponding to each of a plurality of operations is predetermined. If there is the same command name as character information obtained by recognizing the voice, the operating unit 406 accepts an operation that instructs the execution of a command corresponding to the command name. Moreover, the character information obtained by the voice recognition is accepted as an input value, for example, a character string or numerical sequence. Moreover, the operating unit 406 includes a line-of-sight detection sensor that detects the user's line of sight, and identifies a portion that the user is visually recognizing from the line of sight detected by the line-of-sight detection sensor and a portion displayed on the display unit 404 to accept an operation that specifies a processing target portion. For example, a button for accepting permission is displayed on the display unit 404. If the line of sight detected by the line-of-sight detection sensor is located on the button, the operating unit 406 accepts the user's permission operation.

Figure 3:
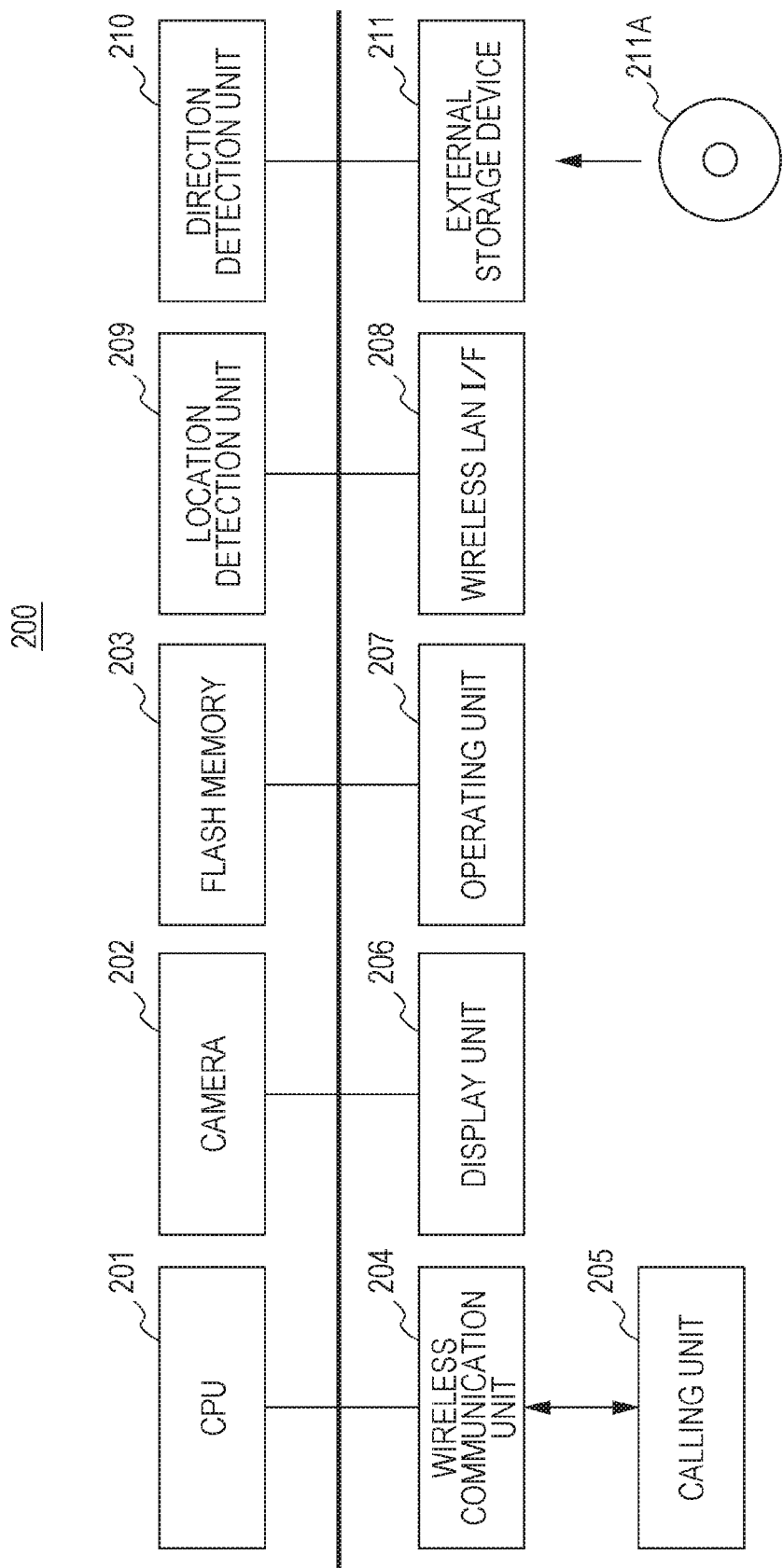
FIG. 3 is a block diagram illustrating an example of an outline of a hardware configuration of a mobile information apparatus according to the embodiment.

FIG. 3 is a block diagram illustrating an example of an outline of a hardware configuration of a mobile information apparatus according to the embodiment. With reference to FIG. 3, the mobile information apparatus 200 includes a CPU 201 for controlling the entire mobile information apparatus 200, a camera 202, a flash memory 203 where data is stored in a nonvolatile manner, a wireless communication unit 204 connected to a calling unit 205, a display unit 206 that displays information, an operating unit 207 that accepts the user's operation, a wireless LAN I/F 208, a location detection unit 209, a direction detection unit 210, and an external storage device 211.

The wireless communication unit 204 communicates wirelessly with a base station for mobile phones connected to a telephone communication network. The wireless communication unit 204 connects the mobile information apparatus 200 to the telephone communication network to enable a call using the calling unit 205. The wireless communication unit 204 decodes a voice signal obtained by demodulating a wireless signal received from the base station for mobile phones to output it to the calling unit 205. Moreover, the wireless communication unit 204 encodes a voice input from the calling unit 205 and transmits it to the base station for mobile phones. The calling unit 205 is provided with a microphone and a speaker, outputs, from the speaker, a voice input from the wireless communication unit 204, and outputs, to the wireless communication unit 204, a voice input from the microphone. Furthermore, the wireless communication unit 204 is controlled by the CPU 201, connects the mobile information apparatus 200 to an electronic mail server to transmit and receive electronic mails.

The camera 202 includes a lens and a photoelectric conversion device, and forms an image of light condensed by the lens on the photoelectric conversion device. The photoelectric conversion device photoelectrically converts the received light, and outputs the image data to the CPU 201. The photoelectric conversion device is a CMOS (Complementary Metal Oxide Semiconductor) sensor, a CCD (Charge Coupled Device) sensor, or the like.

The display unit 206 is a display device such as a liquid crystal display (LCD) or organic ELD, and displays an instruction menu for the user, and information related to the acquired image data, and the like. The operating unit 207 includes a plurality of keys, and accepts inputs of data such as various instructions, characters, and numerics based on the user's operations corresponding to the keys.

Moreover, the operating unit 207 includes a touchscreen. The touchscreen detects a position instructed by the user on a display surface of the display unit 206. The touchscreen is provided on the upper or lower surface of the display unit 206 and outputs, to the CPU 201, coordinates of the position instructed by the user. The touchscreen is provided superimposed on the display unit 206. Accordingly, when the user gives instructions on the display surface of the display unit 206, the touchscreen outputs, to the CPU 201, one or more sets of coordinates corresponding respectively to one or more positions instructed by the user on the display surface of the display unit 206. The touchscreen can use, for example, a resistive system, surface acoustic wave system, infrared system, electromagnetic induction system, or capacitive system. Its system is not limited.

The wireless LAN I/F 208 is an interface for communicating with the wireless station 3, and connecting the mobile information apparatus 200 to the network 2. IP addresses of the HMD 400, the servers 500 and 500A, the MFP 100, and the PC 300 are preregistered in the mobile information apparatus 200. Accordingly, the mobile information apparatus 200 can communicate with the HMD 400, the servers 500 and 500A, the MFP 100, and the PC 300 to enable the transmission and receipt of data. The embodiment is described taking, as an example, a case where the mobile information apparatus 200 uses the wireless LAN I/F 208 to communicate with the MFP 100, the PC 300, the HMD 400, and the servers 500 and 500A. However, another communication method may be used for communications. Specifically, if a short-range wireless device with, for example, Bluetooth (registered trademark) is mounted on the mobile information apparatus 200, the MFP 100, the PC 300, the HMD 400, and the server 500, the mobile information apparatus 200 may communicate one-on-one with any of the MFP 100, the PC 300, the HMD 400, and the server 500. Moreover, the mobile information apparatus 200 may be connected to any of the MFP 100, the PC 300, the HMD 400, and the server 500 in a wired manner such as a USB (Universal Serial Bus) cable to communicate one-on-one with any of the MFP 100, the PC 300, the HMD 400, and the server 500.

A program to be executed by the CPU 201, or data necessary to execute the program, is stored in the flash memory 203. The CPU 201 loads the program recorded in the flash memory 203 into RAM equipped with the CPU 201 to execute the program. In this case, another computer connected to the network 2 or the Internet 5 may rewrite the program stored in the flash memory 203, or add and write a new program. Furthermore, the mobile information apparatus 200 may download the program from another computer connected to the network 2 or the Internet 5 to store the program in the flash memory 203. The program here includes not only a program that can be executed directly by the CPU 201 but also a source program, a compressed program, and an encoded program.

The location detection unit 209 detects the current location of the mobile information apparatus 200. Specifically, the location detection unit 209 is a Global Positioning System receiver. The location detection unit 209 receives radio waves from a plurality of GPS satellites to determine the current location. The location detection unit 209 outputs, to the CPU 201, a value indicating the determined current location, for example, latitude and longitude.

The direction detection unit 210 detects the direction in which the camera 202 of the mobile information apparatus 200 faces. Specifically, the direction detection unit 210 is a magnetometer that measures the Earth's magnetic field. The direction detection unit 210 outputs the detected direction to the CPU 201. The direction detection unit 210 is installed in the mobile information apparatus 200 in such a manner as to be able to detect the imaging direction of the camera 202, in other words, the direction in which the optical axis of the lens of the camera 202 points. The direction detection unit 210 is not limited to the magnetometer and may use a gyroscope or the like.

The external storage device 211 is detachable from the mobile information apparatus 200. A CD-ROM 211A where a remote control program is stored can be inserted into the external storage device 211. The CPU 201 can access the CD-ROM 211A via the external storage device 211. The CPU 201 can load, into the RAM equipped with the CPU 201, the remote control program recorded in the CD-ROM 211A inserted into the external storage device 211 to execute the remote control program.

The program recorded in the flash memory 203 or the CD-ROM 211A has been described as the program to be executed by the CPU 201. However, it may be a program obtained by another computer connected to the network 2 rewriting the program stored in the flash memory 203, or a new program added and written. Furthermore, it may be a program downloaded by the mobile information apparatus 200 from another computer connected to the network 2. The program here includes not only a program that can be executed directly by the CPU 201 but also a source program, a compressed program, and an encoded program.

The medium where the program to be executed by the CPU 201 is stored is not limited to the CD-ROM 211A, and may be an optical disc (MO/MD/DVD), IC card, optical memory card, or semiconductor memory such as Mask ROM, EPROM, or EEPROM.

The hardware configurations of the server 500 and the server 500A are the same. The hardware configuration of the server 500 is described here. When each member of the server 500A is indicated hereinafter, if it is the same member as one included in the server 500, it is indicated by a reference numeral to which a letter "A" is added to a reference numeral assigned to the member included in the server 500.

Figure 4:
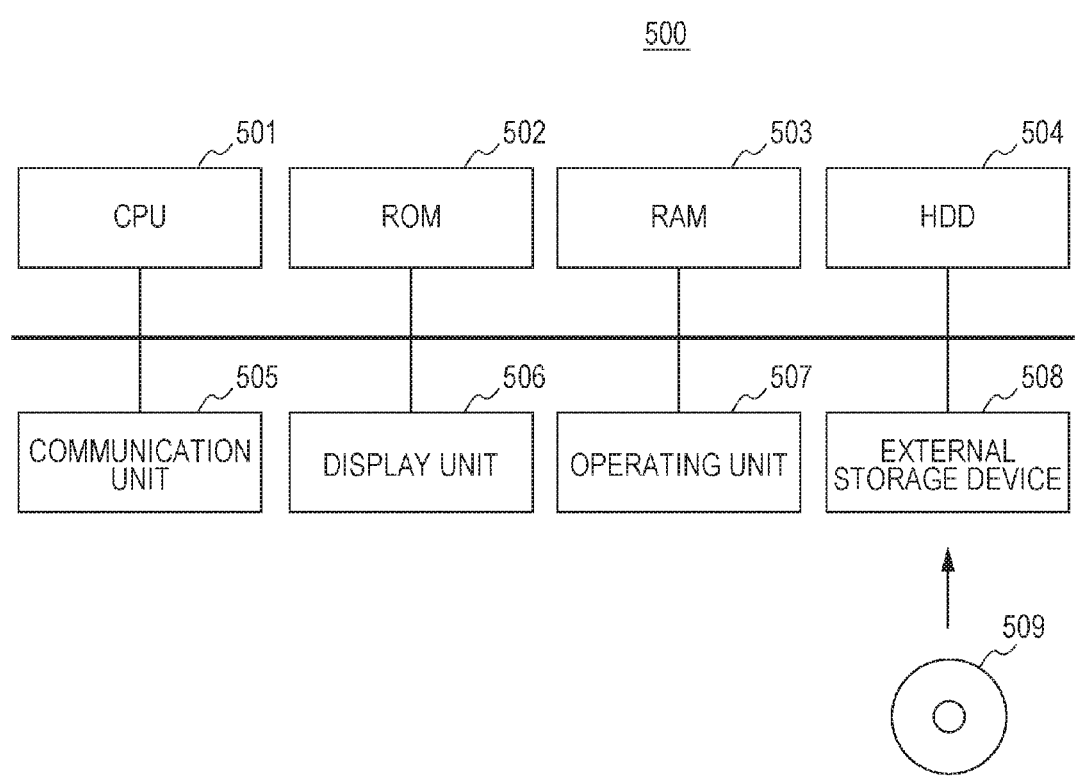
FIG. 4 is a block diagram illustrating an example of a hardware configuration of a server according to the embodiment.

FIG. 4 is a block diagram illustrating an example of a hardware configuration of a server according to the embodiment. With reference to FIG. 4, the server 500 includes a CPU 501 for controlling the entire server 500, a ROM 502 in which a program to be executed by the CPU 501 is stored, a RAM 503 used as a work area of the CPU 501, a HDD 504 in which data is stored in a nonvolatile manner, a communication unit 505 that connects the CPU 501 to the network 2, a display unit 506 that displays information, an operating unit 507 that accepts an input of the user's operation, and an external storage device 508.

The CPU 501 loads, into the RAM 502, the program stored in the ROM 502 or the HDD 504 to execute the program. A CD-ROM 509 where a program is stored can be inserted into the external storage device 508. The CPU 501 can access the CD-ROM 509 via the external storage device 508. The CPU 501 can load, into the RAM 502, the program recorded in the CD-ROM 509 to execute the program.

The program recorded in the ROM 502, the HDD 504, or the CD-ROM 509 has been described as the program to be executed by the CPU 501. However, it may be a program obtained by another computer connected to the network 2 rewriting the program stored in the HDD 504, or a new program added and written. Furthermore, it may be a program downloaded by the server 500 from another computer connected to the network 2. The program here includes not only a program that can be executed directly by the CPU 501 but also a source program, a compressed program, and an encoded program.

The medium where the program to be executed by the CPU 501 is stored is not limited to the CD-ROM 509, and may be an optical disc (MO/MD/DVD), IC card, optical memory card, or semiconductor memory such as Mask ROM, EPROM, or EEPROM.

Figure 5:
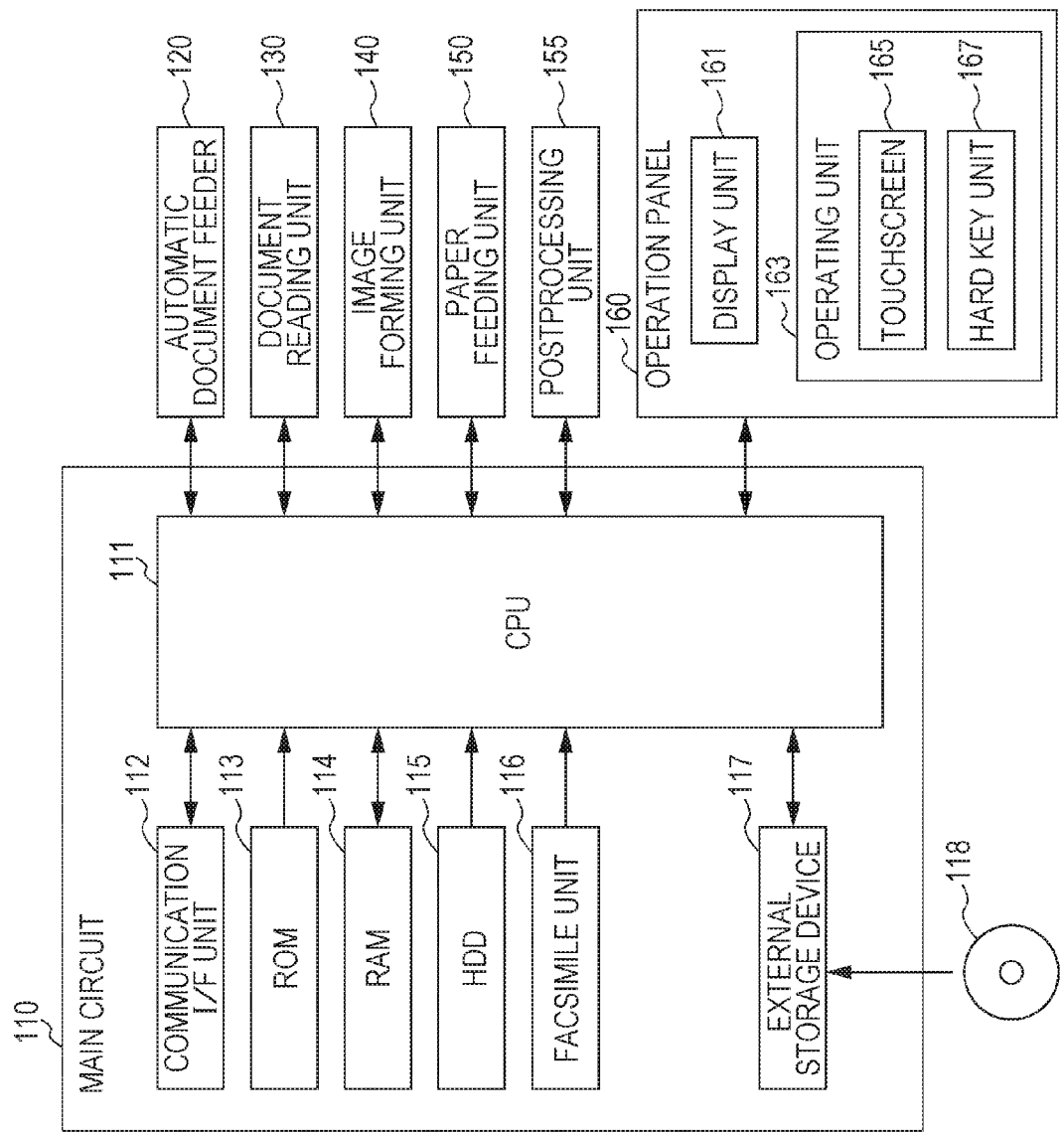
FIG. 5 is a block diagram illustrating an example of a hardware configuration of a MFP according to the embodiment.

FIG. 5 is a block diagram illustrating an example of a hardware configuration of a MFP according to the embodiment. With reference to FIG. 5, the MFP 100 includes a main circuit 110, a document reading unit 130 for reading a document, an automatic document feeder 120 for feeding a document to the document reading unit 130, an image forming unit 140 for forming an image on a sheet or the like based on image data output after the document reading unit 130 reading the document, a paper feeding unit 150 for feeding sheets to the image forming unit 140, a postprocessing unit 155 that processes the sheet on which the image has been formed, and an operation panel 160 as a user interface.

The postprocessing unit 155 executes a sorting process of sorting one or more sheets on which an image has been formed by the image forming unit 140, and ejecting the sheet(s), a punching process of punching holes, and a stapling process of driving staples.

The main circuit 110 includes a CPU 111, a communication interface (I/F) unit 112, a ROM 113, a RAM 114, a hard disk drive (HDD) 115 as a mass storage device, a facsimile unit 116, and an external storage device 117 into which a CD-ROM 118 is inserted. The CPU 111 is connected to the automatic document feeder 120, the document reading unit 130, the image forming unit 140, the paper feeding unit 150, the postprocessing unit 155, and the operation panel 160, and controls the entire MFP 100.

A program to be executed by the CPU 111, or data necessary to execute the program, is stored in the ROM 113. The RAM 114 is used as a work area when the CPU 111 executes the program. Moreover, read data (image data) consecutively transmitted from the document reading unit 130 is temporarily stored in the RAM 114.

The operation panel 160 is provided on an upper surface of the MFP 100, and includes a display unit 161 and an operating unit 163. The display unit 161 is a display device such as a liquid crystal display (LCD) or an organic ELD (Electro-Luminescence Display), and displays an instruction menu for the user, and information related to acquired image data, and the like. The operating unit 163 includes a hard key unit 167 formed with a plurality of keys, and accepts inputs of data such as various instructions, characters, and numerics based on the user's operations corresponding to the keys. The operating unit 163 further includes a touchscreen 165 provided on the display unit 161.

The communication I/F unit 112 is an interface for connecting the MFP 100 to the network 2. The CPU 111 communicates, via the communication I/F unit 112, with the mobile information apparatus 200, the PC 300, the HMD 400, and the server 500 to transmit and receive data. Moreover, the communication I/F unit 112 can communicate with the server 500A connected to the Internet 5, via the network 2.

The facsimile unit 116 is connected to the public switched telephone network (PSTN) to transmit facsimile data to the PSTN or to receive facsimile data from the PSTN. The facsimile unit 116 stores the received facsimile data in the HDD 115 or outputs it to the image forming unit 140. The image forming unit 140 prints, on a sheet, the facsimile data received by the facsimile unit 116. Moreover, the facsimile unit 116 converts data stored in the HDD 115 into facsimile data to transmit the facsimile data to a facsimile machine connected to the PSTN.

A CD-ROM (Compact Disk ROM) 118 is inserted into the external storage device 117. The CPU 111 can access the CD-ROM 118 via the external storage device 117. The CPU 111 loads, into the RAM 114, a program recorded in the CD-ROM 118 inserted into the external storage device 117 to execute the program. The medium where the program to be executed by the CPU 111 is stored is not limited to the CD-ROM 118, and may be an optical disc (MO (Magnetic Optical Disc)/MD (Mini Disc)/DVD (Digital Versatile Disc)), IC card, optical memory card, or semiconductor memory such as Mask ROM, EPROM (Erasable Programmable ROM), or EEPROM (Electrically EPROM).

Moreover, the program to be executed by the CPU 111 is not limited to the program recorded in the CD-ROM 118. A program stored in the HDD 115 may be loaded into the RAM 114 to be executed. In this case, another computer connected to the network 2 may rewrite the program stored in the HDD 115 of the MFP 100, or add and write a new program. Furthermore, the MFP 100 may download the program from another computer connected to the network 2 to store the program in the HDD 115. The program here includes not only a program that can be executed directly by the CPU 111 but also a source program, a compressed program, and an encoded program.

In the data registration system 1, data is transmitted and received between the MFP 100, the mobile information apparatus 200, the PC 300, the HMD 400, and the servers 500 and 500A. Any protocol can be used as a protocol for transmitting and receiving data as long as it can identify the source in an apparatus on a receiving side. For example, HTTP (HyperText Transfer Protocol), FTP (File Transfer Protocol), SMTP (Simple Mail Transfer Protocol), and POP (Post Office Protocol) are used as the protocol for transmitting and receiving data.

In the data registration system 1 according to the embodiment, the server 500 stores a first table in a predetermined storage area of the HDD 504. The first table can be viewed by a user A, but cannot be viewed by a user B. The first table includes a plurality of records that provides personal information of a plurality of users including the user A. Moreover, the server 500A stores a second table in a predetermined storage area of a HDD 504A. The second table can be viewed by the user B, but cannot be viewed by the user A. The second table includes a plurality of records containing personal information of the plurality of users.

Each of the plurality of records included in the first table includes a plurality of items of a first type, and is provided in a format of the first table. The format of the first table provides an item name of each of the plurality of items of the first type constituting a record included in the first table, and the data format and the size of a value set in the item.

Each of the plurality of records included in the second table includes a plurality of items of a second type, and is provided in a format of the second table. The format of the second table provides an item name of each of the plurality of items of the second type constituting a record included in the second table, and the data format and the size of a value set in the item.

The first table format and the second table format can be the same, but are different in some cases. A description is given here taking, as an example, a case where the first and second table formats are partly different from each other. The case where the first and second table formats are partly different from each other includes a case where the number of items of the first type is different from the number of items of the second type, a case where the arrangement order of the plurality of items of the first type is different from the arrangement order of the plurality of items of the second type, and a case where an item of the first type is different in item name, or data format and size of a value to be set, from its corresponding item of the second type.

FIG. 6 is a diagram illustrating an example of a data structure of the first table. With reference to FIG. 6, the data structure of the first table includes items under first item name, items under second item name, items under data format, items under size. The items under first item name include name, date of birth, gender, blood type, home, job, and educational background. The first item name "name" includes second item names "last name" and "first name." The first item name "date of birth" includes second item names "anno Domini" and "era name." Moreover, the first item names "gender" and "blood type" include no second item name. Furthermore, the first item name "home" includes second item names "zip code," "address," "telephone number," "mobile phone," and "electronic mail address." The first item name "job" includes second item names "company name," "department name," "title," "zip code," "address," "telephone number," "mobile phone," and "electronic mail address." Moreover, the first item name "educational background" includes second item names "elementary school," "junior high school," "high school," and "university." Moreover, the data format and the size are provided for each second item name.

Figures 7, 8:
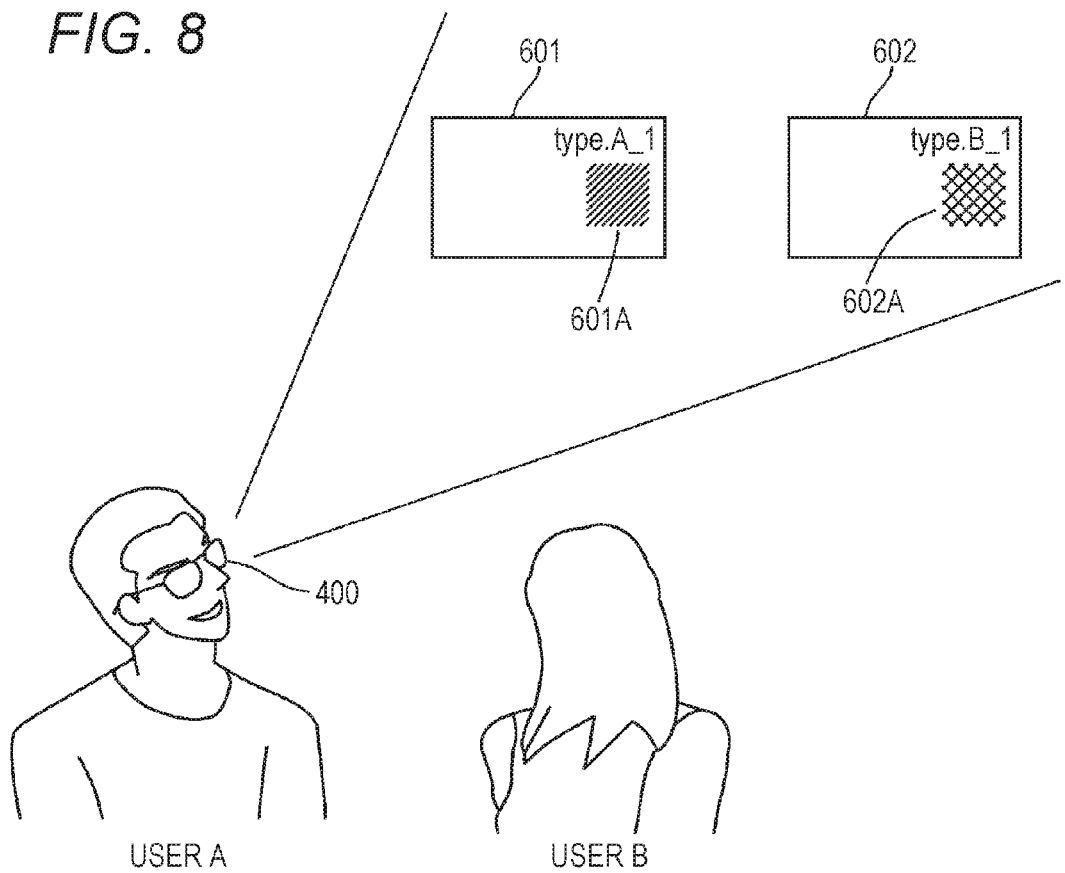
FIG. 7 is a diagram illustrating an example of a data structure of a second table.
FIG. 8 is a diagram schematically illustrating a scene where a user A visits a user B.

FIG. 7 is a diagram illustrating an example of a data structure of the second table. With reference to FIG. 7, the data structure of the second table includes items under item name, items under data format, and items under size. The items under item name includes name, date of birth (anno Domini), gender, zip code, address 1, address 2 (lot/house number), address 3 (building), telephone number, mobile phone, electronic mail address. Moreover, the data format and the size are provided for each item name.

A description is given here taking, as an example, a case where personal information related to the user A registered in the first table registered in the server 500 is registered in the second table viewable by the user B and registered in the server 500A.

FIG. 8 is a diagram schematically illustrating a scene where the user A visits the user B. With reference to FIG. 8, a state is illustrated where the user A is visually recognizing a first card 601 and a second card 602 via the HMD 400, wearing the HMD 400. The user B may visually recognize the first card 601 and the second card 602 via the HMD 400, wearing the HMD 400.

The first card 601 is a card possessed by the user A, on which an image 601A is depicted. The second card 602 is a card possessed by the user B, on which an image 602A is depicted. The images 601A and 602A are, for example, two-dimensional barcodes such as QR codes (registered trademark), and have a predetermined shape. For example, business cards can be used for the first card 601 and the second card 602.

The image 601A is a first image identifying input data. The input data here is a record related to the user A among a plurality of records included in the first table stored in the server 500. The image 601A includes record determination information for identifying the record related to the user A, and attribute information indicating that the record is input data. The record determination information includes a network address being location information of the first table on a network, and record identification information for identifying one of the plurality of records included in the first table. For example, a URL can be used for the network address. A record number assigned to the record, or user identification information if the record includes an item of user identification information for identifying the user A, can be used for the record identification information.

The image 602A is a second image identifying a storage area. The storage area here is the second table stored in the server 500A. The image 602A includes table determination information for identifying the second table stored in the server 500A, and attribute information indicating that the table is a storage area. The table determination information includes a network address indicating a location of the second table on the network.

When the user A sees the first card 601 and the second card 602, the imaging area of the camera 402 of the HMD 400 includes the image 601A depicted on the first card 601A at a time, and the image 602A depicted on the second card 602. When the user A causes the HMD 400 to capture the images 601A and 602A with the camera 402, the HMD 400 registers a record of the first table identified by the image 601A, in the second table identified by the image 602A. This is described in more detail below.

Figure 9:
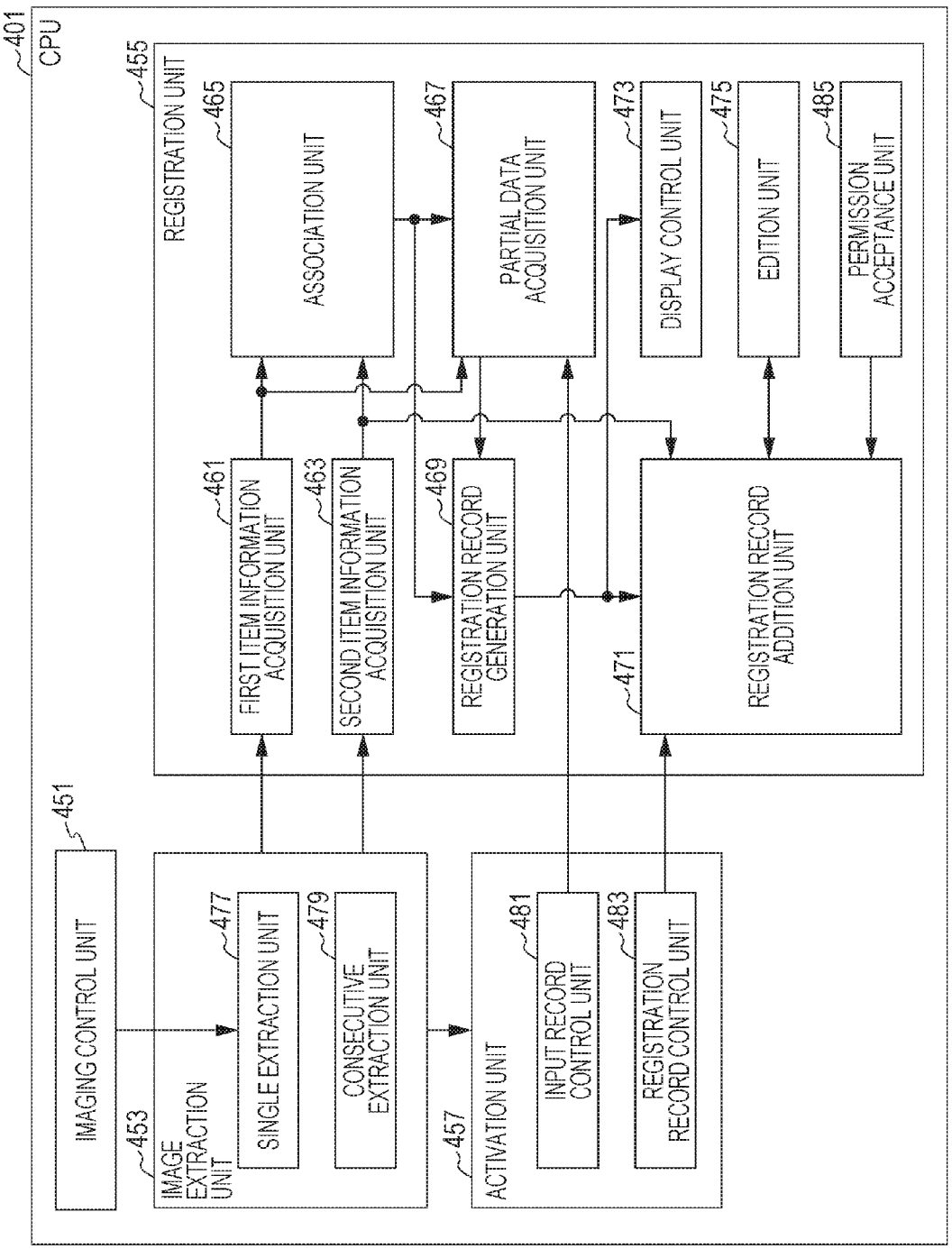
FIG. 9 is a block diagram illustrating an example of an outline of functions of a CPU included in the HMD.

FIG. 9 is a block diagram illustrating an example of an outline of functions of the CPU included in the HMD. The functions illustrated in FIG. 9 are functions formed in the CPU 401 included in the HMD 400 by the CPU 401 executing a data registration program stored in the flash memory 403. With reference to FIG. 9, the CPU 401 includes an imaging control unit 451 that controls the camera 402, an image extraction unit 453, a registration unit 455, and an activation unit 457.

The imaging control unit 451 controls the camera 402, and acquires a captured image obtained by the camera 402 capturing an image of a subject and outputting it. When the operating unit 406 has accepted an image-capture instruction from the user, the imaging control unit 451 causes the camera 402 to capture an image of the subject. The imaging control unit 451 outputs the captured image to the image extraction unit 453. If the camera 402 sets the first card 601 and the second card 602 as subjects, the captured image output by the camera 402 includes the image 601A being the first image and the image 602A being the second image.

The image extraction unit 453 extracts a plurality of images of a predetermined shape from the captured image input from the imaging control unit 451. The images targeted by the image extraction unit 453 for extraction here are two-dimensional barcodes. The image extraction unit 453 extracts, from the captured image, images of the shape predetermined for two-dimensional barcodes. The image extraction unit 453 outputs the plurality of extracted two-dimensional barcode images to the registration unit 455 and the activation unit 457. The image extraction unit 453 outputs nothing to the registration unit 455 and the activation unit 457 if not extracting two or more images of the shape predetermined for two-dimensional barcodes.

The image extraction unit 453 includes a single extraction unit 477 and a consecutive extraction unit 479. The single extraction unit 477 extracts a plurality of two-dimensional barcodes from one captured image. For example, if an image of the first card 601 of the user A and an image of the second card 602 of the user B are captured as subjects, the single extraction unit 477 extracts the images 601A and 602A as two-dimensional barcodes from the captured image input from the imaging control unit 451. In this case, the images 601A and 602A can be extracted in single image capture with the camera 402.

The consecutive extraction unit 479 extracts one or more two-dimensional barcodes respectively from a plurality of captured images. For example, if the imaging control unit 451 captures an image of the first card 601 of the user A as a subject, and then captures an image of the second card 602 of the user B as a subject, the consecutive extraction unit 453 extracts the image 601A as a two-dimensional barcode from the captured image input from the imaging control unit 451, and then extracts the image 602A as a two-dimensional barcode from the captured image input from the imaging control unit 451. Moreover, the consecutive extraction unit 478 may extract the images 601A and 602A respectively from at least two of a plurality of captured images input from the imaging control unit 451. In this case, a plurality of captured images captured at different times can be used. For example, captured images obtained by capturing the images 601A and 602A at different places can be used.

The registration unit 455 includes a first item information acquisition unit 461, a second item information acquisition unit 463, an association unit 465, a partial data acquisition unit 467, a registration record generation unit 469, a registration record addition unit 471, a display control unit 473, an edition unit 475, and a permission acceptance unit 479.

The first item information acquisition unit 461 identifies a two-dimensional barcode corresponding to input data from a plurality of two-dimensional barcodes input from the image extraction unit 453. Specifically, a two-dimensional barcode including attribute information indicating to be input data is identified. The first item information acquisition unit 461 acquires first item information related to the plurality of items of the first type constituting the input data identified by the two-dimensional barcode corresponding to input data. A specific description is given here taking, as an example, a case of identifying the image 601A being the first image as the two-dimensional barcode corresponding to input data. The first item information acquisition unit 461 acquires the first item information of the first table including a record identified by the record determination information included in the identified image 601A. The first item information indicates a format of the first table. The format of the first table includes an item name of each of the plurality of items of the first type constituting a record included in the first table, and the data format and the size of a value set in the item.

Specifically, the first item information acquisition unit 461 identifies the server 500 from a network address of the first table included in the record determination information. The first item information acquisition unit 461 then controls the wireless LAN I/F 405 to transmit a first item information transmission request to the server 500 and receive the first item information transmitted by the server 500. In response to the receipt of the first item information, the first item information acquisition unit 461 outputs the first item information to the association unit 465, and outputs the record determination information to the partial data acquisition unit 467.

The second item information acquisition unit 463 identifies a two-dimensional barcode corresponding to a storage area from a plurality of two-dimensional barcodes input from the image extraction unit 453. Specifically, a two-dimensional barcode including attribute information indicating to be a storage area is identified. The second item information acquisition unit 463 acquires second item information related to the plurality of items of the second type constituting data to be stored in the storage area identified by the two-dimensional barcode corresponding to the storage area. A specific description is given here taking, as an example, a case of identifying the image 602A being the second image as the two-dimensional barcode corresponding to a storage area. The second item information acquisition unit 463 acquires the second item information of the second table identified by the table determination information included in the identified image 602A. The second item information indicates a format of the second table. The format of the second table includes an item name of each of the plurality of items of the second type constituting a record included in the second table, and the data format and the size of a value set in the item.

Specifically, the second item information acquisition unit 463 identifies the server 500A from a network address of the second table, which is the table determination information. The second item information acquisition unit 463 then controls the wireless LAN I/F 405 to transmit a second item information transmission request to the server 500A and receive the second item information transmitted by the server 500A. In response to the receipt of the second item information, the second item information acquisition unit 463 outputs the second item information to the association unit 465, and outputs the table determination information to the registration record addition unit 471.

The association unit 465 receives an input of the first item information from the first item information acquisition unit 461, and an input of the second item information from the second item information acquisition unit 463. The association unit 465 associates each of the plurality of items of the second type with any of the plurality of items of the first type based on the first item information and the second item information. For example, a basic item table including basic items to be a reference, a first table-specific conversion table that provides items corresponding between the basic item table and the first table, and a second table-specific conversion table that provides items corresponding between the basic item table and the second table are prepared in advance.

Figures 10, 11:
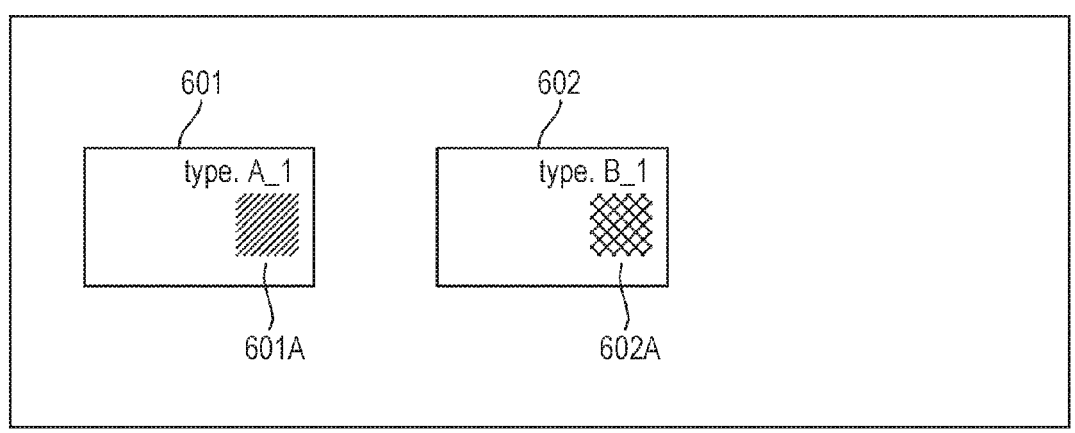
FIG. 10 is a diagram illustrating an example of a basic item table.
FIG. 11 is a first diagram illustrating an example of a captured image captured by a camera of the HMD.

FIG. 10 is a diagram illustrating an example of the basic item table. With reference to FIG. 10, the basic item table includes, as item names, "name," "date of birth (anno Domini)," "gender," "zip code," "address," "telephone number," "mobile phone," "electronic mail address." In the first table-specific conversion table corresponding to the first table illustrated in FIG. 6, the second item name "last name" and the second item name "first name" of the first item name "name" of the first table are associated with the item name "name" of the basic item table. Moreover, the second item name "anno Domini" of the first item name "date of birth" of the first table is associated with the item name "date of birth (anno Domini)" of the basic item table. Moreover, the first item name "gender" of the first table is associated with the item name "gender" of the basic item table. Furthermore, the second item name "zip code," the second item name "address," the second item name "telephone number," the second item name "mobile phone," and the second item name "electronic mail address" for the first item name "home" or "job" of the first table are respectively associated with the item name "zip code" of the basic item table, the item name "address" of the basis item table, the item name "telephone number" of the basic item table, the item name "mobile phone" of the basic item table, and the item name "electronic mail address" of the basis item table.

In the second table-specific conversion table corresponding to the second table illustrated in FIG. 8, the item name "name" of the second table is associated with the item name "name" of the basic item table. Moreover, the item name "date of birth (anno Domini)" of the second table is associated with the item name "date of birth (anno Domini)" of the basic item table. Moreover, the item name "gender" of the second table is associated with the item name "gender" of the basic item table. Furthermore, the item name "zip code" of the second table is associated with the item name "zip code" of the basic item table, the item names "address 1," "address 2 (lot/house number)," and "address 3 (building)" of the second table with the item name "address" of the basic item table, the item name "telephone number" of the second table with the item name "telephone number" of the basic item table, the item name "mobile phone" of the second table with the item name "mobile phone" of the basic item name, and the item name "electronic mail address" of the second table with the item name of "electronic mail address" of the basic item table.

Returning to FIG. 9, the association unit 465 determines a basic item associated with an item of the second type in the second table-specific conversion table, for each of the plurality of items of the second type, and associates the determined basic item with an item of the first type associated with the determined basic item in the first table-specific conversion table. The association unit 465 generates association information where the plurality of items of the second type is associated with the plurality of items of the first type, and outputs the first item information, the second item information, and the association information to the partial data acquisition unit 467 and the registration record generation unit 469.

If the above-mentioned first table-specific conversion table and second table-specific conversion table are used, the item name "name" of the second table is associated with the second item name "last name" and the second item name "first name" of the first item name "name" of the first table. The item name "date of birth (anno Domini)" of the second table is associated with the second item name "anno Domini" of the first item name "date of birth" of the first table. The item name "gender" of the second table is associated with the first item name "gender" of the first table. The item name "zip code" of the second table is associated with the second item name "zip code" of the first item name "home" of the first table. The item name "address 1" of the second table is associated with the second item name "address" of the first item name "home" of the first table. The item name "telephone number" of the second table is associated with the second item name "telephone number" of the first item name "home" of the first table. The item name "mobile phone" of the second table is associated with the second item name "mobile phone" of the first item name "home" of the first table. The item name "electronic mail address" of the second table is associated with the second item name "electronic mail address" of the first item name "home" of the first table.

Part of the plurality of items of the second type may not be associated with any of the plurality of items of the first type. In the above-mentioned example, the item name "address 2 (lot/house number)" and the item name "address 3 (building)" of the second table are not associated with any item of the first table. Moreover, part of the plurality of items of the first type may not be associated with any of the plurality of items of the second type. In the above-mentioned example, the second item name "era name" of the first item name "date of birth" of the first table, the first item name "blood type," all the second item names of the first item name "job," and all the second item names of the first item name "educational background" are not associated with any item of the second table.

The partial data acquisition unit 467 receives an input of the record determination information from the first item information acquisition unit 461, and inputs of the first item information, the second item information, and the association information from the association unit 465. The association information associates each of the plurality of items of the second type with any of the plurality of items of the first type. The first item information is information related to the plurality of items of the first type constituting the input data identified by the first image, here, the record received from the server 500. The second item information is information related to the plurality of items of the second type constituting the data registered in the storage area identified by the second image, here, the record registered in the second table stored in the server 500A. The partial data acquisition unit 467 controls the wireless LAN I/F 405 and uses the network address of the first table included in the record determination information to transmit a record transmission request to the server 500. The record transmission request includes the record determination information.

When having received the record transmission request, the server 500 extracts a record identified by the record determination information from a plurality of records included in the first table, and replies with the record. When the wireless LAN I/F 405 has received the record with which the server 500 replied, the partial data acquisition unit 467 converts the record to partial data, and outputs the partial data to the registration record generation unit 469. Specifically, the partial data acquisition unit 467 identifies a target item from the plurality of items of the first type constituting the record acquired from the server 500, based on the first item information and the association information. Specifically, the partial data acquisition unit 467 refers to the association information, and sets, as the target item(s), one or more items of the first type associated with any of the plurality of items of the second type among the plurality of items of the first type. The partial data acquisition unit 467 then generates partial data composed of a value(s) set in the target item(s) in the record received from the server 500.

The registration record generation unit 469 receives inputs of the first item information, the second item information, and the association information from the association unit 465, and receives an input of the partial data from the partial data acquisition unit 467. The registration record generation unit 469 generates a registration record based on the partial data and the association information in response to the input of the partial data from the partial data acquisition unit 467. The registration record is data obtained by converting the data set in the one or more target items included in the partial data into data of the corresponding item(s) of the second type. Specifically, the registration record generation unit 469 converts the data set in the target item of the partial data into the data format and the size of an item of the second type corresponding to the target item, based on the data format and the size provided by the first item information for the target item, and the data format and the size provided by the second item information for an item of the second type corresponding to the target item. The registration record generation unit 469 outputs the generated registration record to the registration record addition unit 471 and the display control unit 473. Moreover, the registration record generation unit 469 further outputs the second item information to the registration record addition unit 471.

The display control unit 473 controls the display unit 404 in response to the input of the registration record from the registration record generation unit 469, and displays the registration record on the display unit 404.

The registration record addition unit 471 receives inputs of the registration record and the second item information from the registration record generation unit 469. The registration record addition unit 471 outputs the registration record to the edition unit 475 in response to the input of the registration record.

The edition unit 475 edits the registration record input from the registration record addition unit 471 based on the user's instruction. The edition of the registration record includes change or deletion of part of the registration record, and addition of part of the registration record. The edition unit 475 edits the registration record in accordance with an editing operation accepted by the operating unit 406. The edition unit 475 outputs the edited registration data to the registration record addition unit 471.

The permission acceptance unit 479 controls the operating unit 406 to accept the user's permission operation after the display control unit 473 displays the registration data on the display unit 404. The permission acceptance unit 479 outputs a permission signal to the registration record addition unit 471 in response to the acceptance of the user's permission operation.

The registration record addition unit 471 receives an input of the table determination information from the second item information acquisition unit 463, and inputs of the registration data and the second item information from the registration record generation unit 469. After having received the inputs of the registration data and the second item information from the registration record generation unit 469, the registration record addition unit 471 adds and stores the registration record input from the registration record generation unit 469, or the edited registration record if the edited registration data has been input from the edition unit 474, in the storage area in response to the input of the permission signal from the permission acceptance unit 479. Specifically, the registration record addition unit 471 identifies the server 500A where the second table is stored, based on the table determination information, and controls the wireless LAN I/F 405 to transmit an addition request. The addition request includes the registration record or edited registration record, and the table determination information.

In the server 500A, which receives the addition request, when the addition request is received, the registration record included in the addition request is added to the second table identified by the table determination information included in the addition request.

The image extraction unit 453 may extract a third image in addition to the image 601A being the first image and the image 602A being the second image. The third image includes a command indicating a predetermined process, and attribute information indicating to be a command. The command includes an input record control command that provides a process targeting input data for processing, and a registration record control command that provides a process targeting a registration record for processing.

The input record control command provides a process for the input data identified by the first image. For example, the input record control command provides a process of restricting the output of part of the input data. Moreover, the input record control command provides a process of notifying that the input data has been output to the outside. Moreover, the input record control command provides a process of dividing the input data into pieces. Furthermore, the input record control command provides a process of combining the plurality of pieces of input data into one.

Moreover, the registration record control command provides a process for data to be stored in the storage area identified by the second image. For example, the registration record control command provides a process of notifying that data has been added in the storage area identified by the second image.

The activation unit 457 identifies a two-dimensional barcode providing a command, as the third image, from a plurality of two-dimensional barcodes input from the image extraction unit 453. Specifically, a two-dimensional barcode including attribute information indicating to be a command is identified. The activation unit 457 uses the command included in the identified two-dimensional barcode to execute the process.

The activation unit 457 includes an input record control unit 481 and a registration record control unit 483. If the command included in the two-dimensional barcode identified as the third image among the plurality of two-dimensional barcodes input from the image extraction unit 453 is the input record control command, the input record control unit 481 executes a process specified by the input record control command, on the input data identified by the first image. The input record control unit 481 causes a computer that stores the record identified by the first image to execute the input record control command. Hence, the input record control unit 481 outputs the input record control command to the partial data acquisition unit 467 to cause the computer that stores the input data identified by the first image to execute the input record control command.

If having received an input of the input record control command from the input record control unit 481, the partial data acquisition unit 467 transmits, to the server 500, a record transmission request including the input record control command. If the record transmission request includes the input record control command, the server 500 executes the input record control command, and executes a process provided by the input record control command on the extracted record. For example, if the input record control command provides a process of restricting the output of one or more items of the plurality of items of the first type constituting a plurality of records included in the first table, the server 500 generates and replies with a record excluding data of the restricted one or more items. Moreover, if the input record control command includes an electronic mail address, and provides a process of notifying that the record identified by the record determination information has been output to the outside, the server 500 generates and transmits an electronic mail including a message that notifies that the record has been output to the outside, the electronic mail having the electronic mail address set as the destination. Moreover, if the input record control command provides a process of dividing the plurality of items constituting a record included in the first table into a first record including only a plurality of first items, and a second record including only a plurality of second items, the record is divided into the first record including only the plurality of first items, and the second record including only the plurality of second items. For example, the record of the first table illustrated in FIG. 6 is divided into the first record including only "name," "date of birth," "gender," "blood type," "home," and "educational background" under first item, and the second record including only "name," "date of birth," "gender," "blood type," "company," and "educational background" under first item. The first and second records are different in a point that while the first record does not include the first item "company" but includes the first item "home," the second record does not include the first item "home" but includes the first item "company." Furthermore, if the input record control command provides a process of converting a plurality of records into one combined record with a plurality of items, one record is generated where a common value among the plurality of records is set in items having the same set value among the plurality of records, the same items having different set values are added as separate items, and the values set respectively in the plurality of records are set in the added separate items.

The input record control unit 481 may execute the input record control command. In this case, the partial data acquisition unit 467 is required to acquire, from the server 500, the input data identified by the first image, here, the record included in the first table, and the input record control unit 481 is required to execute the input record control command on the acquired record. In this case, the partial data acquisition unit 467 does not need to set the input record control command in the record transmission request.

If the command included in the two-dimensional barcode identified as the third image among the plurality of two-dimensional barcodes input from the image extraction unit 453 is the registration record control command, the registration record control unit 483 executes a process identified by the registration record control command, on data to be registered in the storage area identified by the second image. The registration record control unit 483 causes a computer that stores the storage area identified by the second image to execute the registration record control command. Hence, the registration record control unit 483 outputs the registration record control command to the registration record addition unit 471 in order to cause the computer that stores the storage area identified by the second image to execute the registration record control command.

If having received the input of the registration record control command from the registration record control unit 483, the registration record addition unit 471 transmits an addition request including the registration record control command to the server 500A.

If the addition request includes the registration record control command, the server 500A adds the registration record and then executes the registration record control command. For example, if the registration record control command includes an electronic mail address and provides a process of notifying that the registration record has been added, the server 500A generates and transmits an electronic mail including a message notifying that the registration record has been added, the electronic mail having the electronic mail address set as the destination.

The registration record control unit 483 may execute the registration record control command. In this case, the registration record addition unit 471 does not need to include the registration record control command in the addition request.

FIG. 11 is a first diagram illustrating an example of a captured image captured by the camera of the HMD. With reference to FIG. 11, the captured image includes the first card 601 and the second card 602. The first card 601 includes the image 601A being the first image. The second card 602 includes the image 602A being the second image.

Figure 12:
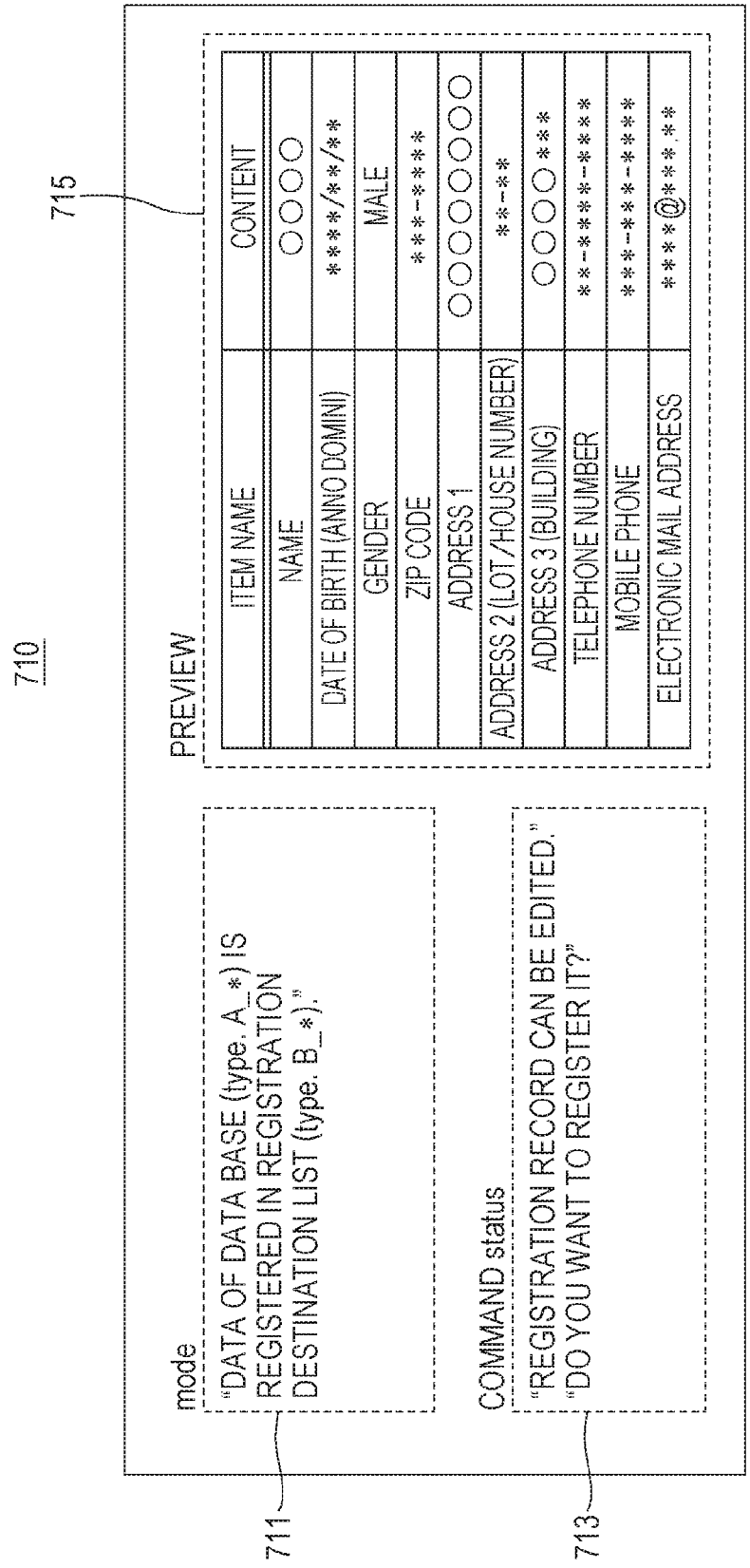
FIG. 12 is a diagram illustrating an example of an edit screen displayed on the HMD.

FIG. 12 is a diagram illustrating an example of an edit screen displaced on the HMD. Here, an example is illustrated of the edit screen displayed on the display unit 404 if the captured image illustrated in FIG. 11 is output from the camera 402. With reference to FIG. 12, the edit screen includes an area 711 indicating a process content, an area 713 indicating the current status, and an area 715 displaying a registration record. The area 711 includes a message indicating the content of a process to be executed by the HMD 400. The message is created by the edition unit 475 using a name "registration destination list (type. B_*)" assigned to the second table, and a name "database (type. A_*)" assigned to the first table. The message is "Data of the database (type. A_*) is registered in the registration destination list (type. B_*)." The user can recognize the process to be executed by the HMD 400 by looking at the message displayed in the area 711.

The area 713 includes a message indicating the status of the process to be executed by the HMD 400. The message includes the message: "The registration record can be edited." "Do you want to register it?" The user who reads the messages displayed in the area 713 can recognize that the HMD 400 is on standby for the input of the user's operation.

A registration record is displayed in the area 715. The user can edit the registration record with the operating unit 406. If the user edits the registration record, the edited registration record is displayed in the area 715. Consequently, the user can check the edition content by looking in the area 715.

Figure 13:
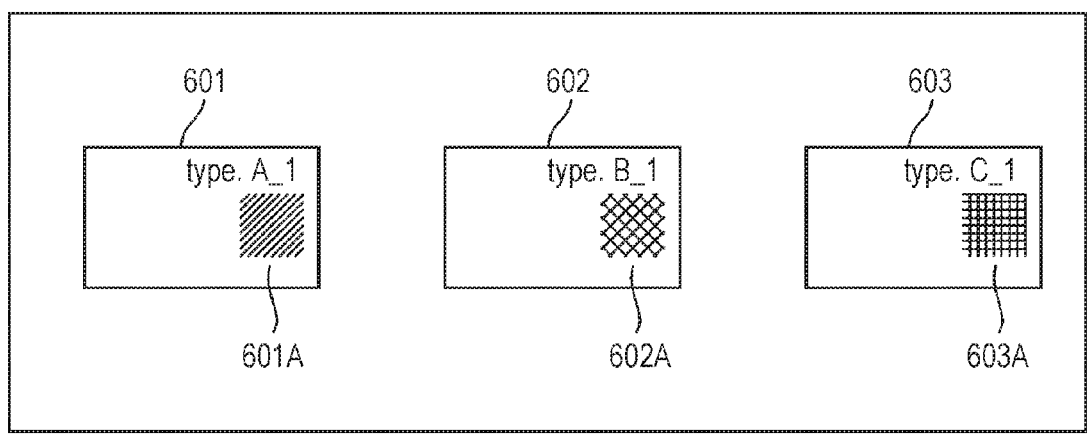
FIG. 13 is a second diagram illustrating an example of a captured image captured by the camera of the HMD.

FIG. 13 is a second diagram illustrating an example of a captured image captured by the camera of the HMD. With reference to FIG. 13, the captured image includes the first card 601, the second card 602, and a third card 603. The first card 601 includes the image 601A being the first image. The second card 602 includes the image 602A being the second image. The third card 603 includes an image 603A being the third image. The image 603A being the third image includes a command indicating a predetermined process, and attribute information indicating to be a command. A description is given here taking, as an example, a case where the command is the input record control command that provides a process targeting input data for processing. For example, in a case of outputting any of the second item names "zip code," "address," "telephone number," "mobile phone," and "electronic mail address" in the first table illustrated in FIG. 6, the input record control command provides a process of outputting the first item name "job" on a priority basis. In this case, in the first table-specific conversion table, the second item name "zip code," the second item name "address," the second item name "telephone number," the second item name "mobile phone," and the second item name "electronic mail address" for the first item name "job" of the first table are respectively associated with the item name "zip code" of the basic item table, the item name "address" of the basic item table, the item name "telephone number" of the basic item table, the item name "mobile phone" of the basic item table, and the item name "electronic mail address" of the basic item table.

<Modification of the Association Unit 465>

The association unit 465 in a modification compares the item names of the plurality items of the second types with the item names of the plurality of items of the first type, and associates the items of the first and second types, the items having the same or similar item name. Moreover, a group of a plurality of the same or similar item names may be predetermined to associate items of the first and second types, the items belonging to the same group.

Figure 14:
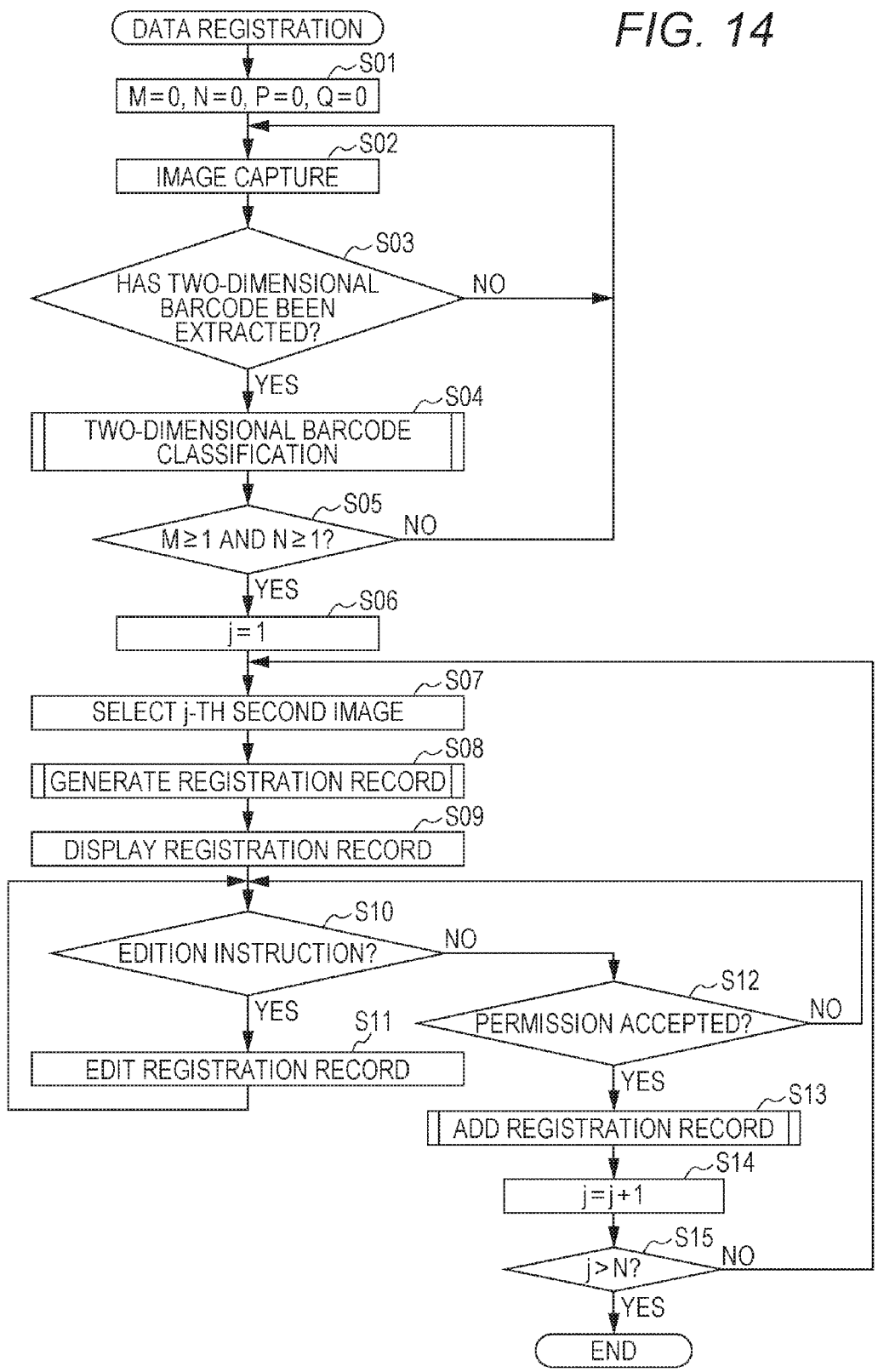
FIG. 14 is a diagram illustrating an example of the flow of a data registration process.

FIG. 14 is a diagram illustrating an example of the flow of a data registration process. The data registration process is a process to be executed by the CPU 401 included in the HMD 400 by the CPU 401 executing the program stored in the flash memory 403. With reference to FIG. 14, the CPU 401 sets "0" being an initial value for each of variables M, N, P, and Q (Step S01). The variable M is a variable for counting the first images. The first image identifies input data. Accordingly, the variable M is also a variable for counting the number of pieces of input data. The variable N is a variable for counting the second images. The second image identifies a storage area. Accordingly, the variable N is also a variable for counting the number of storage areas. The variable P is a variable for counting the input record control commands. The variable Q is a variable for counting the number of the registration record control commands.

In the next Step S02, the camera 402 is controlled to capture an image of a subject. The processing is advanced to Step S03. In Step S03, it is determined whether or not a two-dimensional barcode has been extracted from the captured image obtained by the camera 402 capturing and outputting the image of the subject. If a two-dimensional barcode has been extracted, the processing is advanced to Step S04. If not, the processing is returned to Step S02.

In Step S04, a two-dimensional barcode classification process is executed to advance the processing to Step S05. Although the details of the two-dimensional barcode classification process are described later, it is a process of classifying the two-dimensional barcode extracted in Step S02 as any of the first, second, and third images, and counting the number of each of pieces of input data, storage areas, input record control commands, and registration record control commands.

In Step S05, it is determined whether or not the number M of first images and the number N of second images are respectively one or more. If there are at least one first image and one second image, the processing is advanced to Step S06. If not, the processing is returned to Step S02. If at least one first image and one second image have not been extracted, the processing of Step S04 and later is not executed. In other words, the processing of Step S04 or later is executed if at least one piece of input data and one storage area are provided.

In Step S06, an initial value "1" is set for a variable j. The processing is advanced to Step S07. The variable j is a variable for identifying a second image targeted for processing. In Step S07, the j-th second image is selected as the processing target. The processing is advanced to Step S08.

In Step S08, a registration record generation process is executed. The processing is advanced to Step S09. Although the details of the registration record generation process are described later, it is a process of generating a registration record based on the j-th second image and the first to the M-th first images.

In Step S09, the registration record generated in Step S08 is displayed on the display unit 404. The processing is advanced to Step S10. In Step S10, it is determined whether or not to have accepted an edition instruction. It is determined whether or not the operating unit 406 has accepted the user's edition instruction. If the edition instruction has been accepted, the processing is advanced to Step S11. If not, the processing is advanced to Step S12. In Step S11, the registration record is edited following the edition instruction. The processing is returned to Step S10.

In Step S12, it is determined whether or not to have accepted the user's permission. It is determined whether or not the operating unit 406 has accepted the user's permission. If the user's permission has been accepted, the processing is advanced to Step S13. If not, the processing is returned to Step S10. In Step S13, a registration record addition process is executed. The processing is advanced to Step S14. Although the details of the registration record addition process are described later, it is a process of storing the registration record generated in Step S08, or the edited registration record if the registration record has been edited in Step S11, based on the j-th second image.

In Step S14, the variable j is incremented to advance the processing to Step S15. This is for changing the processing target second image. In Step S15, it is determined whether or not the variable j is greater than the variable N. If the variable j is greater than the variable N, it is determined that the process that targets all the second images for processing has been executed. The processing is then ended. If not, the processing is returned to Step S07.

Figure 15:
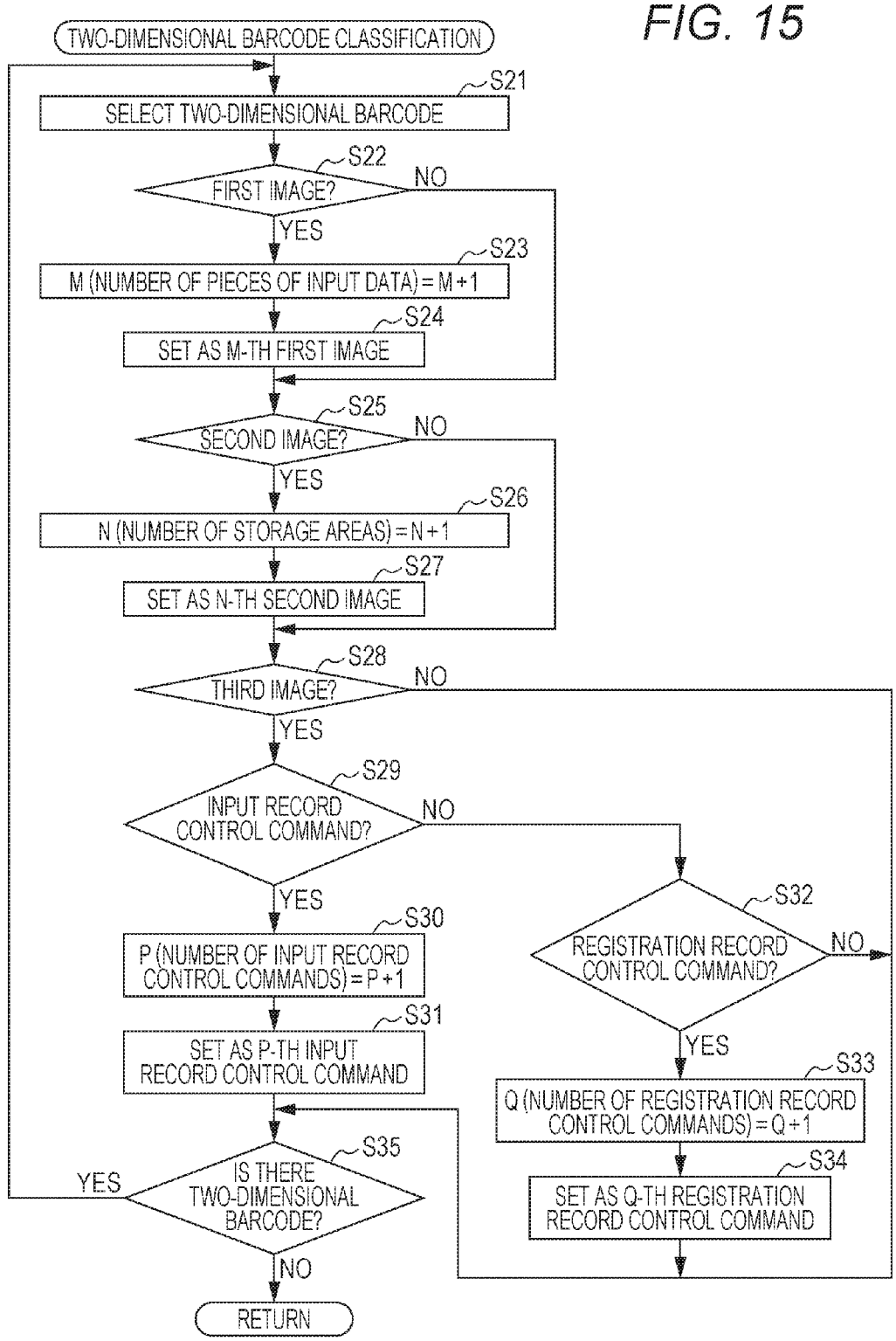
FIG. 15 is a flowchart illustrating an example of the flow of a two-dimensional barcode classification process.

FIG. 15 is a flowchart illustrating an example of the flow of the two-dimensional barcode classification process. The two-dimensional barcode classification process is the process executed in Step S04 of FIG. 14. At the step before the execution of the two-dimensional barcode classification process, one or more two-dimensional barcodes have been extracted. With reference to FIG. 15, the CPU 401 selects one of the one or more two-dimensional barcodes as the processing target (Step S21). It is determined whether or not the two-dimensional barcode selected as the processing target in Step S21 is the first image (Step S22). Specifically, it determined whether or not the attribute information included in the selected two-dimensional barcode indicates input data. If the attribute information indicates input data, the selected two-dimensional barcode is determined to be the first image. The processing is advanced to Step S23. If not, the processing is advanced to Step S25. In Step S23, the variable M indicating the number of pieces of input data is incremented. The processing is advanced to Step S24. In Step S24, the two-dimensional barcode is set as the M-th first image. The processing is advanced to Step S25.

In Step S25, it is determined whether or not the two-dimensional barcode selected as the processing target in Step S21 is the second image. Specifically, it is determined whether or not the attribute information included in the selected two-dimensional barcode indicates a storage area. If the attribute information indicates a storage area, the selected two-dimensional barcode is determined to be the second image. The processing is advanced to Step S26. If not, the processing is advanced to Step S28. In Step S26, the variable N indicating the number of storage areas is incremented. The processing is advanced to Step S27. In Step S27, the two-dimensional barcode is set as the N-th second image. The processing is advanced to Step S28.

In Step S28, it is determined whether or not the two-dimensional barcode selected as the processing target in Step S21 is the third image. Specifically, it is determined whether or not the attribute information included in the selected two-dimensional barcode indicates a command. If the attribute information indicates a command, the selected two-dimensional barcode is determined to be the third image. The processing is advanced to Step S29. If not, the processing is advanced to Step S35. In Step S29, it is determined whether or not the command included in the two-dimensional barcode is the input record control command. If the two-dimensional barcode includes the input record control command, the processing is advanced to Step S30. If not, the processing is advanced to Step S32. In Step S30, the variable P indicating the number of input record control commands is incremented. The processing is advanced to Step S31. In Step S31, the input record control command included in the two-dimensional barcode is set as the P-th input record control command. The processing is advanced to Step S35.

In Step S32, it is determined whether or not the command included in the two-dimensional barcode is the registration record control command. If the two-dimensional barcode includes the registration record control command, the processing is advanced to Step S33. If not, the processing is advanced to Step S35. In Step S33, the variable Q indicating the number of registration record control commands is incremented. The processing is advanced to Step S34. In Step S34, the registration record control command included in the two-dimensional barcode is set as the Q-th registration record control command. The processing is advanced to Step S35.

In Step S35, it is determined whether or not there is a two-dimensional barcode that has not been selected as the processing target. If there is an unprocessed two-dimensional barcode, the processing is returned to Step S21. If not, the processing is returned to the data registration process.

Figure 16:
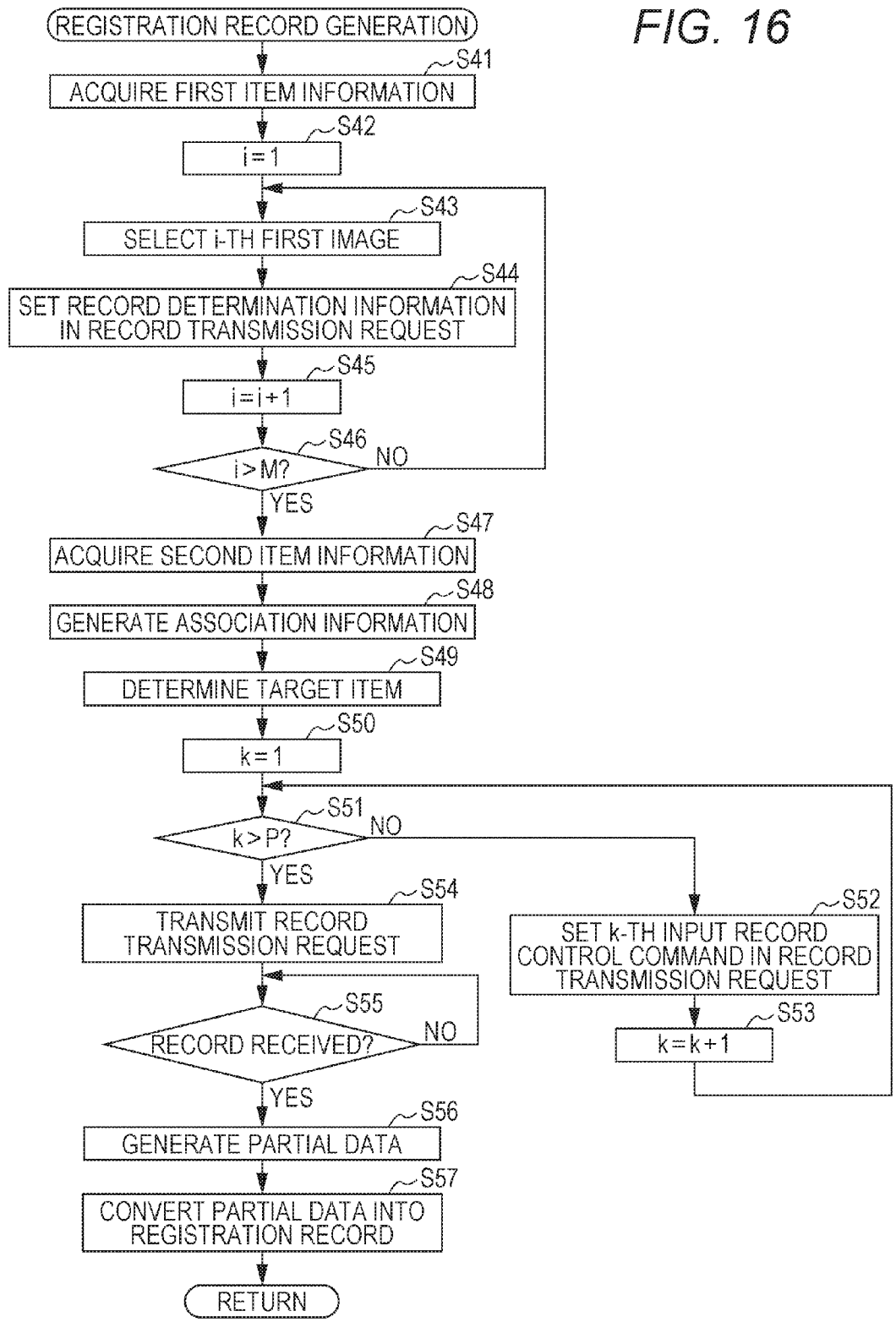
FIG. 16 is a flowchart illustrating an example of the flow of a registration record generation process.

FIG. 16 is a flowchart illustrating an example of the flow of the registration record generation process. At the step before the execution of the registration record generation process, one i-th first image and one j-th second image have been selected. Moreover, if the variable P is one or greater, P input record control commands have been determined. For the sake of description, a description is given here taking, as an example, of a case where the first first image and the first second image have been selected. Furthermore, a description is given taking, as an example, a case where: The first first image includes the record determination information for identifying a record; The record determination information includes the network address of the first table stored in the server 500, and the user identification information for identifying the user A as the record identification information; The first second image includes the table determination information for identifying a storage destination; The table determination information is the network address of the second table stored in the server 500A. The first first image is hereinafter simply referred to as the first image, and the first second image as the second image.

With reference to FIG. 16, the CPU 401 acquires the first item information based on the first image (Step S41). The server 500 is identified based on the network address of the first table included in the record determination information included in the first image. The wireless LAN I/F 405 is controlled to transmit a first item information transmission request to the server 500 and receive the first item information transmitted by the server 500. The first item information indicates a format of the first table, and includes an item name of each of the plurality of items of the first type constituting a record included in the first table, and the data format and the size of a value set in the item.

In the next Step S42, the initial value "1" is set for a variable i. The processing is advanced to Step S43. The variable i is a variable for identifying a first image targeted for processing. In Step S43, the i-th first image is selected as the processing target. The processing is advanced to Step S43.

In the next Step S44, the record determination information included in the first image selected as the processing target is set in a record transmission request. The processing is advanced to Step S45. In Step S45, the variable i is incremented. The processing is advanced to Step S46. This is for changing the processing target first image. In Step S46, it is determined whether or not the variable i is greater than the variable M. If the variable i is greater than the variable M, it is determined that the processing of Step S44 has been executed targeting all the first images for processing. The processing is advanced to Step S47. If not, the processing is returned to Step S43. If the processing is advanced to Step S47, M pieces of record determination information included respectively in the first to the M-th first images are set in the record transmission request.

In Step S47, the second item information is acquired based on the second image. The server 500A is identified based on the network address of the second table, which is the table determination information included in the second image. The wireless LAN I/F 405 is controlled to transmit a second item information transmission request to the server 500A and receive the second item information transmitted by the server 500A. The second item information indicates a format of the second table, and includes an item name of each of the plurality of items of the second type constituting a record included in the second table, and the data format and the size of a value set in the item.

In the next Step S48, association information is generated. Association information where each of the plurality of items of the second type is associated with any of the plurality of items of the first type is generated based on the first item information acquired in Step S41, and the second item information acquired in Step S47. For example, the first table-specific conversion table that provides items corresponding between the basic item table and the first table and the second table-specific conversion table that provides items corresponding between the basic item table and the second table are used to determine a basic item associated with an item of the second type in the second table-specific conversion table, for each of the plurality of items of the second type, and associate the determined basic item with an item of the first type associated with the determined basic item in the first table-specific conversion table. Accordingly, the association information is generated.

In the next Step S49, the first item information and the association information is used to determine a target item. The processing is advanced to Step S50. Specifically, with reference to the association information, one or more items of the first type associated with any of the plurality of items of the second type among the plurality of items of the first type are set as the target item(s). In the next Step S50, the one or more target items are set in a record transmission request.

In Step S51, the initial value "1" is set for a variable k. The variable k is a variable that identifies an input record control command targeted for processing. In the next Step S52, it is determined whether or not the variable k is greater than the variable P. The variable P is a value set in the above-mentioned two-dimensional barcode classification process, and indicates the number of input record control commands. If the variable k is greater than the variable P, the processing is advanced to Step S55. If not, the processing is advanced to Step S53. In Step S53, the k-th input record control command is set in the record transmission request. The processing is advanced to Step S54. In Step S54, the variable k is incremented. The processing is returned to Step S52. This is for changing the processing target input record control command.

In Step S55, the record transmission request is transmitted. The processing is advanced to Step S56. Specifically, the server 500 is identified based on the network address of the first table included in the record determination information included in each of the first to the M-th first images. The wireless LAN I/F 405 is controlled to transmit the record transmission request to the server 500. The record transmission request includes the record determination information set in Step S44, item identification information for identifying the one or more target items set in Step S50, and the input record control command set in Step S53 if Step S53 is executed.

The server 500, which receives the record transmission request, extracts a record identified by the record determination information from the plurality of records included in the first table, and replies with the extracted record. Hence, in the next Step S55, it is determined whether or not the wireless LAN I/F 405 has received the record with which the server 500 replied. If it is in a standby status until receipt of the record from the server 500 (NO in Step S55), and then the record is received from the server 500 (YES in Step S55), the processing is advanced to Step S56.

In Step S56, partial data composed of the values set in the target items identified in Step S49 among the plurality of items of the first type is generated for the record received in Step S55. The processing is advanced to Step S57.

In Step S57, the partial data is converted into a registration record. The processing is returned to the data registration process. Specifically, a registration record is generated based on the partial data generated in Step S56, the association information generated in Step S48, and the second item information. The registration record is data obtained by converting data set in the one or more target items included in the partial data into data of the corresponding items of the second type. Specifically, the values set in the target items of the partial data are in the data format and the size that are provided in the first item information. Accordingly, the values set in the target items of the partial data are converted into the data format and the size that are provided in the second item information for the items of the second type associated by the association information with the target items. Accordingly, the registration record is generated.

In Step S56, a plurality of pieces of partial data is received in a case where there is a plurality of first images, and a case where even if there is one first image, the input record control command provides a process of dividing the record identified by the record determination information into a plurality of records. In Step S56, if a plurality of records is received from the server 500 in Step S55, a plurality of pieces of partial data is respectively generated based on the plurality of received records. Moreover, in Step S57, the plurality of pieces of partial data is converted into a plurality of registration records.

Moreover, FIG. 16 illustrates the case where all of the plurality of records identified respectively by the first to the M-th first images are registered in the same table, here, the first table. However, if the plurality of records identified respectively by the first to the M-th first images is registered in different tables, the first to the M-th first images are required to be grouped according to the tables where they are registered and execute the registration record generation process illustrated in FIG. 16 according to the plurality of groups.

Figure 17:
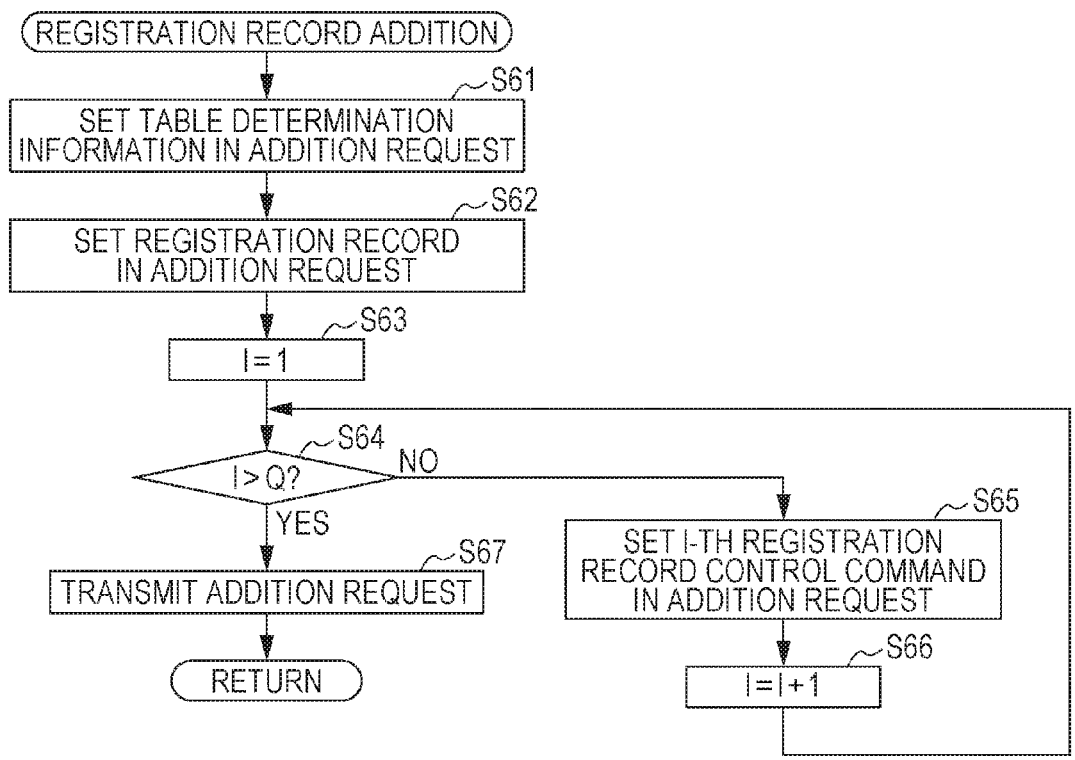
FIG. 17 is a flowchart illustrating an example of the flow of a registration record addition process.

FIG. 17 is a flowchart illustrating an example of the flow of the registration record addition process. The registration record addition process is the process executed in Step S15 of FIG. 14. At the step before the execution of the registration record addition process, a second image targeted for processing has been determined, and a registration record has been generated. Moreover, if the variable Q is one or greater, Q registration record control commands have been determined. With reference to FIG. 17, the CPU 401 sets second table determination information included in the second image, in an addition request (Step S61). In the next Step S62, the registration record is set in the addition request.

In the next Step S63, the initial value "1" is set for a variable l. The variable l is a variable that identifies a registration record control command targeted for processing. In the next Step S64, it is determined whether or not the variable l is greater than the variable Q. The variable Q is a value set in the above-mentioned two-dimensional barcode classification process, and indicates the number of registration record control commands. If the variable l is greater than the variable Q, the processing is advanced to Step S67. If not, the processing is advanced to Step S65. In Step S65, the l-th registration record control command is set in the addition request. The processing is advanced to Step S66. In Step S66, the variable l is incremented. The processing is returned to Step S64. This is for changing the processing target registration record control command.

In Step S67, the addition request is transmitted based on the second image. The processing is returned to the data registration process. Specifically, the server 500A is identified based on the network address of the first table, which is the table determination information included in the second image. The wireless LAN I/F 405 is controlled to transmit the addition request to the server 500A. The addition request includes the table determination information set in Step S61, the registration record set in Step S62, and the registration record control command set in Step S65 if Step S65 is executed. In the server 500A, which receives the addition request, the registration record included in the addition request is added to the second table identified by the table determination information included in the addition request after the receipt of the addition request.

Figure 18:
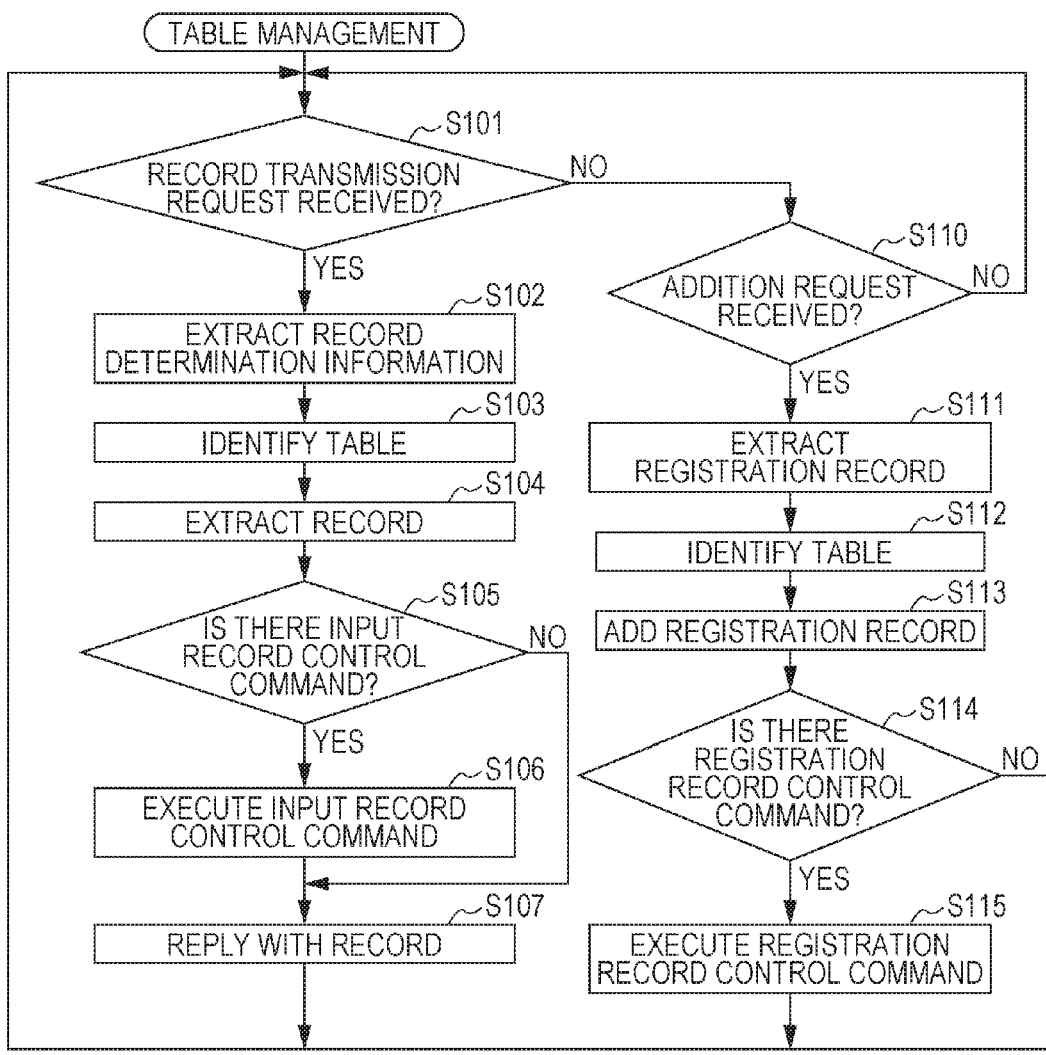
FIG. 18 is a diagram illustrating an example of the flow of a table management process.

FIG. 18 is a diagram illustrating an example of the flow of a table management process. The table management process is a process to be executed by the CPU 501 included in the server 500 by the CPU 501 executing the program stored in the ROM 502, the HDD 504, or the CD-ROM 509. Moreover, it is a process to be executed by the CPU 501A included in the server 500A by the CPU 501A executing the program stored in the ROM 502A, the HDD 504A, or the CD-ROM 509A. A description is given here taking, as examples, a case where the CPU 501 included in the server 500 executes Steps S101 to S109, and a case where the CPU 501A included in the server 500A executes Steps S110 to S115.

With reference to FIG. 18, the CPU 501 included in the server 500 determines whether or not to have received a record transmission request (Step S101). It is determined whether or not the communication unit 505 has received a record transmission request from the HMD 400 being the information processing apparatus. If a record transmission request has been received, the processing is advanced to Step S102. If not, the processing is advanced to Step S110.

In Step S102, the record determination information is extracted from the received record transmission request. A first table stored in the HDD 504 is identified based on the network address of the first table included in the record determination information (Step S103). A record where user identification information same as the user identification information included in the record determination information is set from a plurality of records included in the identified first table (Step S104).

In the next Step S105, it is determined whether or not the record transmission request received in Step S101 includes the input record control command. If the input record control command is included, the processing is advanced to Step S106. If not, the processing is advanced to Step S107. In Step S106, the input record control command is executed. The processing is advanced to Step S107. For example, if the input record control command provides a process of restricting the output of part of the plurality of items constituting a record included in the first table, when the record extracted in Step S104 includes the restricted item, the value set in the restricted item is erased from the record. Moreover, if the input record control command includes an electronic mail address, and provides a process of notifying that the record identified by the record determination information has been output to the outside, an electronic mail is generated and transmitted which includes a message notifying that the record extracted in Step S104 has been output to the outside, and has the electronic mail address set as the destination address. Moreover, if the input record control command provides a process of dividing the record into a plurality of records, the record extracted in Step S104 is divided into a plurality of records. For example, if the input record control command provides a process of making a division into a first record including only a plurality of first items and a second record including only a plurality of second items, the record extracted in Step S104 is divided into the first record including only the plurality of first items and the second record including only the plurality of second items. Furthermore, if the input record control command provides a process of converting a plurality of records into one combined record including a plurality of items, the record transmission request received in Step S101 includes a plurality of pieces of record determination information, and a plurality of records identified respectively by the plurality of pieces of record determination information is extracted in Step S104. Hence, a new record is generated which includes a plurality of new items corresponding respectively to items having the same set value among the plurality of records extracted in Step S104, and to items having different set values among the plurality of records. Common values among the plurality of records are set in the items of the generated record, the items having the same set values among the plurality of records. A plurality of values set in the items having different set values among the plurality of records is respectively set in the plurality of new items. Accordingly, one record is generated.

In Step S107, the record extracted in Step S104, or the record on which the input record control command has been executed in Step S106 if Step S106 is executed, is returned, via the communication unit 505, to an apparatus that transmitted the record transmission request. The processing is advanced to Step S110.

The CPU 501A included in the server 500A determines whether or not to have received an addition request in Step S110. It is determined whether or not the communication unit 505 has received an addition request from the HMD 400 being the information processing apparatus. If an addition request has been received, the processing is advanced to Step S111. If not, the processing is returned to Step S101.

In Step S111, the registration record is extracted from the received addition request. The second table stored in the HDD 504 is identified based on the table determination information included in the addition request (Step S112). The registration record is added to the identified second table (Step S113). The processing is advanced to Step S114.

In the next Step S114, it is determined whether or not the received addition request includes the registration record control command. If the registration record control command is included, the processing is advanced to Step S115. If not, the processing is returned to Step S101. The registration record control command is executed in Step S115. The processing is returned to Step S101. For example, if the registration record control command includes an electronic mail address, and provides a process of notifying that a registration record has been added, an electronic mail is generated and transmitted which includes a message notifying that a registration record has been added, and has the electronic mail address set as the destination address.

The above-mentioned embodiment has been described taking the HMD 400 as an example of the information processing apparatus. However, the mobile information apparatus 200 may be caused to function as the information processing apparatus. In this case, the CPU 201 included in the mobile information apparatus 200 has similar functions to those illustrated in FIG. 9, and executes the data registration process illustrated in FIGS. 14 to 17.

<First Modification>

The above-mentioned embodiment has illustrated, as an example, the case where the second table being a storage area is stored in the server 500A. The MFP 100 may store the second table being a storage area in the HDD 115. In this case, it is so configured that the second image 602A is displayed on the display unit 161 included in the operation panel 160 of the MFP 100, and the second image 602A displayed on the display unit 161, and the first image 601A depicted in the first card 601 are captured by the HMD 400 or the mobile information apparatus 200 that is the information processing apparatus. Furthermore, the HMD 400 or the mobile information apparatus 200 that is the information processing apparatus may capture the second image 602A displayed on the display unit 161, the first image 601A depicted on the first card 601, and the third image 603A depicted on the third card 603. The third image 603A may be displayed on the display unit 161 of the MFP 100. In this case, the CPU 111 included in the MFP 100 executes the table management process illustrated in FIG. 18.

<Second Modification>

The input data may be personal information stored by the mobile information apparatus 200 in the flash memory 203. The first table may be an address book stored by the mobile information apparatus 200 in the flash memory 203. In this case, it is so configured that in response to that the user of the mobile information apparatus 200 designates personal information or one record of the address book, the mobile information apparatus 200 displays, on the display unit 206, the two-dimensional barcode being the first image 601A including information identifying the designated personal information, or the record determination information of the record, and the HMD 400 being the information processing apparatus captures the first image 601A displayed on the display unit 206 of the mobile information apparatus 200, and the second image 602A depicted on the second card 602. Furthermore, the HMD 400 being the information processing apparatus may capture the first image 601A displayed on the display unit 206 of the mobile information apparatus 200, the second image 602A depicted on the second card 602, and the third image 603A depicted on the third card 603. The third image 603A may be displayed on the display unit 206 of the mobile information apparatus 200. Moreover, the CPU 201 included in the mobile information apparatus 200 executes the table management process illustrated in FIG. 18.

<Third Modification>

The input data may be personal information stored by the mobile information apparatus 200 in the flash memory 203. The first table may be an address book stored by the mobile information apparatus 200 in the flash memory 203. The MFP 100 may store the second table being a storage area in the HDD 115. In this case, it is so configured that in response to that the user of the mobile information apparatus 200 designates personal information or one record of the address book, the mobile information apparatus 200 displays, on the display unit 206, the two-dimensional barcode being the first image 601A including information identifying the designated personal information or the record determination information of the record. Moreover, it is so configured that the second image 602A is displayed on the display unit 161 included in the operation panel 160 of the MFP 100. The HMD 400 being the information processing apparatus is required to capture the first image 601A displayed on the display unit 206 of the mobile information apparatus 200, and the second image 602A displayed on the display unit 161 of the MFP 100. Furthermore, the HMD 400 being the information processing apparatus is required to capture the first image 601A displayed on the display unit 206 of the mobile information apparatus 200, the second image 602A displayed on the display unit 161 of the MFP 100, and the third image 603A depicted on the third card 603. The third image 603A may be displayed on the display unit 206 of the mobile information apparatus 200 and/or on the display unit 161 of the MFP 100. In this case, the CPU 111 included in the MFP 100 and the CPU 201 included in the mobile information apparatus 200 each execute the table management process illustrated in FIG. 18.

As described above, the HMD 400 according to the embodiment functions as the information processing apparatus, extracts the image 601A being the first image and the image 602A being the second image from a captured image obtained by the camera 402 capturing an image of the first card 601 and the second card 602 and outputting it, and stores a record of the first table stored in the server 500 identified by the image 601A being the first image, in the second table stored in the server 500A identified by the image 602A being the second image. Hence, a record included in the first table stored in the server 500A is added to the second table stored in the server 500A with a simple operation to capture the image 601A being the first image and the image 602A being the second image. Accordingly, it is possible to facilitate data registration.

Moreover, the first item information is acquired which relates to the plurality of items of the first type constituting a record of the first table stored in the server 500. The second item information is acquired which relates to the plurality of items of the second type constituting a record of the second table stored in the server 500A. Each of the plurality of items of the second type is associated with any of the plurality of items of the first type. The record of the first table is converted into data of corresponding items among the plurality of items of the second type. Hence, the record of the first table can be stored in the second table in agreement with the configuration of a record stored in the second table.

Moreover, data of items associated respectively with the plurality of items of the second type among the plurality of items of the first type of the record of the first table is acquired as partial data. Data of at least one item included in the partial data is converted into data of a corresponding item among the plurality of items of the second type of the record of the second table. Hence, only a part necessary to be stored in the second table is acquired from the record of the first table. Accordingly, the processing can be simplified.

Moreover, the first association table and the second association table are used to associate each of the plurality of items of the second type with any of the plurality of items of the first type. Accordingly, even if a record of the first table is different in configuration from a record to be stored in the second table, the record of the first table can be stored in the second table.

Moreover, an item name of each of the plurality of items of the first type constituting a record of the first table is compared with an item name of each of the plurality of items of the second type constituting a record of the second table. The same or similar items are associated. Accordingly, each of the plurality of items of the second type can be associated with any of the plurality of items of the first type.

Moreover, if the image 603A being the third image is extracted, the process provided by the image 603A being the third image is executed. Therefore, another process, in addition to the process of storing a record of the first table in the second table, can be executed by capturing the image 601A being the first image, the image 602A being the second image, and the image 603A being the third image.

If the third image 603A provides the input data control command providing a process that targets, for processing, the input data identified by the image 603A being the first image, a process that targets a record of the first table for processing can be executed.

Moreover, if the image 603A being the third image provides the registration data control command providing a process that targets, for processing, a record registered in the second table, a process that targets, for processing, a record registered in the second table can be executed.

Moreover, the image 601A being the first image and the image 602A being the second image are extracted from a single captured image obtained by the camera 402 capturing an image of subjects and outputting it. Accordingly, a record of the first table can be stored in the second table in single image capture.

Moreover, the image 601A being the first image and the image 602A being the second image are extracted from a plurality of captured images obtained by the camera 402 capturing an image of a subject several times and outputting them. Accordingly, the plurality of captured images captured at different times is used to enable the storage of a record of the first table in the second table.

In the above-mentioned embodiment, the data registration system 1 has been described. However, it is needless to say that in the present invention, the data registration process illustrated in FIGS. 14 to 17 can be interpreted as a data registration method to be executed by the HMD 400 or the mobile information apparatus 200, or the data registration program to cause the CPU 401 included in the HMD 400 or the CPU 201 included in the mobile information apparatus 200 to execute the data registration method.

One or more first images and one or more second images are required to be captured. If the number of first images is set to more than one, a plurality of pieces of input data identified respectively by the plurality of first images can be stored in a storage area identified by the second image. Moreover, if the number of second images is set to more than one, input data identified by the first image can be stored in a plurality of storage areas identified respectively by the second images.

Furthermore, if the third image, in addition to one or more first images and one or more second images, is captured, the number of third images may be more than one. A plurality of processes identified by the plurality of third images can be executed on each of one or more pieces of input data identified respectively by the one or more first images. The plurality of processes identified respectively by the plurality of third images can be executed on each of one or more pieces of data stored respectively in one or more storage areas identified respectively by the one or more second images.

Although the present invention has been described and illustrated in detail, it is clearly understood that the same is by way of illustrated and example only and is not to be taken byway of limitation, the scope of the present invention being interpreted by terms of the appended claims. The scope of the present invention is intended to include equivalent meanings to the claims, and all changes within the scope of the claims.

What is claimed is:

1. An information processing apparatus comprising:
an imaging device including an image sensor configured to capture an image of a subject; and
a processor configured to:
extract a first image and a second image of a predetermined shape from the captured image of the subject captured and output by the imaging device, the first image identifying input data stored in a first storage area, and the second image identifying a second storage area which is different from the first storage area; and
upon extracting the first image and the second image, acquire the input data identified by the first image from the first storage area, and store the input data identified by the first image in the second storage area identified by the second image,
wherein the input data identified by the first image is different from the first image itself.

2. The information processing apparatus according to claim 1, wherein the processor:
acquires first item information related to a plurality of items of a first type constituting the input data identified by the first image,
acquires second item information related to a plurality of items of a second type constituting data to be stored in the second storage area identified by the second image,
associates each of the plurality of items of the second type with any of the plurality of items of the first type based on the first item information and the second item information,
generates registration data by converting the input data, identified by the first image, into data of a corresponding item of the plurality of items of the second type, and
stores the generated registration data in the second storage area.

3. The information processing apparatus according to claim 2, wherein the processor:
acquires, as partial data, data of items associated respectively with the plurality of items of the second type, among the plurality of items of the first type of the input data identified by the first image, and
converts data of at least one item included in the acquired partial data into data of a corresponding item of the plurality of items of the second type.

4. The information processing apparatus according to claim 2, wherein the processor uses a first association table that associates each of the plurality of items of the first type with any of a plurality of basic items, and a second association table that associates each of the plurality of items of the second type with any of the plurality of basic items to associate each of the plurality of items of the second type with any of the plurality of items of the first type.

5. The information processing apparatus according to claim 2, wherein the processor compares an item name of each of the plurality of items of the first type included in the first item information with an item name of each of the plurality of items of the second type included in the second item information.

6. The information processing apparatus according to claim 1, wherein the processor is further configured to, upon extracting a third image in addition to the first image and the second image, the third image providing a predetermined process, execute the process provided by the third image.

7. The information processing apparatus according to claim 6, wherein the predetermined process includes a process targeting the input data identified by the first image for processing.

8. The information processing apparatus according to claim 6,
wherein the processor:
acquires first item information related to a plurality of items of a first type constituting the input data identified by the first image,
acquires second item information related to a plurality of items of a second type constituting data to be stored in the second storage area identified by the second image,
associates each of the plurality of items of the second type with any of the plurality of items of the first type based on the first item information and the second item information,
generates registration data by converting the input data, identified by the first image, into data of a corresponding item of the plurality of items of the second type, and
stores the generated registration data in the second storage area; and
wherein the predetermined process includes a process targeting the registration data to be stored for processing.

9. The information processing apparatus according to claim 1, wherein the processor extracts the first and second images from a single captured image captured and output by the imaging device.

10. The information processing apparatus according to claim 1, wherein the processor extracts the first and second images respectively from a plurality of captured images captured and output by the imaging device.

11. The information processing apparatus according to claim 1, wherein:
the first and the second image are two-dimensional barcodes,
the first image includes location information indicating a location of the input data, and
the second image includes location information indicating a location of the second storage area.

12. The information processing apparatus according to claim 1, further comprising:
a display configured to display an image,
wherein the processor is further configured to:
accept a user's permission operation,
display the registration data on the display,
edit the registration data, and
store the registration data on the condition that the processor accepts the user's permission operation.

13. A data registration method to be executed by an information processing apparatus including an imaging device which includes an image sensor and is configured to capture an image of a subject, the method comprising:
extracting a first image and a second image of a predetermined shape from the captured image of the subject captured and output by the imaging device, the first image identifying input data stored in a first storage area, and the second image identifying a second storage area which is different from the first storage area; and
upon extracting the first image and the second image, acquiring the input data identified by the first image from the first storage area, and storing the input data identified by the first image in the second storage area identified by the second image,
wherein the input data identified by the first image is different from the first image itself.

14. A non-transitory recording medium storing a computer readable data registration program to be executed by a computer controlling an information processing apparatus including an imaging device which includes an image sensor and is configured to capture an image of a subject, the program causing the computer to execute functions comprising:
extracting a first image and a second image of a predetermined shape from the captured image of the subject captured and output by the imaging device, the first image identifying input data stored in a first storage area, and the second image identifying a second storage area which is different from the first storage area; and
upon extracting the first image and the second image, acquiring the input data identified by the first image from the first storage area, and storing the input data identified by the first image in the second storage area identified by the second image,
wherein the input data identified by the first image is different from the first image itself.

15. An information processing apparatus comprising:
an imaging device including an image sensor configured to capture an image of a subject; and
a processor configured to:
extract an image of a predetermined shape from the captured image of the subject captured and output by the imaging device; and
upon extracting a first image identifying input data and a second image identifying a storage area, store the input data identified by the first image in the storage area identified by the second image,
wherein the processor is further configured to:
acquire first item information related to a plurality of items of a first type constituting the input data identified by the first image,
acquire second item information related to a plurality of items of a second type constituting data to be stored in the storage area identified by the second image,
associate each of the plurality of items of the second type with any of the plurality of items of the first type based on the first item information and the second item information,
generate registration data by converting the input data, identified by the first image, into data of a corresponding item of the plurality of items of the second type, and
store the generated registration data in the storage area.

16. The information processing apparatus according to claim 15, wherein the processor:
acquires, as partial data, data of items associated respectively with the plurality of items of the second type, among the plurality of items of the first type of the input data identified by the first image, and converts data of at least one item included in the acquired partial data into data of a corresponding item of the plurality of items of the second type.

17. The information processing apparatus according to claim 15, wherein the processor uses a first association table that associates each of the plurality of items of the first type with any of a plurality of basic items, and a second association table that associates each of the plurality of items of the second type with any of the plurality of basic items to associate each of the plurality of items of the second type with any of the plurality of items of the first type.

18. The information processing apparatus according to claim 15, wherein the processor compares an item name of each of the plurality of items of the first type included in the first item information with an item name of each of the plurality of items of the second type included in the second item information.

* * * * *